(12) United States Patent
Wasson et al.

(10) Patent No.: US 10,647,449 B2
(45) Date of Patent: May 12, 2020

(54) INDIRECT SELF-IMAGING SYSTEMS AND METHODS

(71) Applicant: The Boeing Company, Chicago, IL (US)

(72) Inventors: Christopher James Wasson, Torrance, CA (US); Bradley Whitten Taylor, Lawndale, CA (US); Richard A. Fowell, Rolling Hills Estates, CA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 15/993,570

(22) Filed: May 30, 2018

(65) Prior Publication Data

US 2019/0367191 A1    Dec. 5, 2019

(51) Int. Cl.
| | |
|---|---|
| *G06K 9/46* | (2006.01) |
| *B64G 1/22* | (2006.01) |
| *H04N 5/235* | (2006.01) |
| *H04N 5/341* | (2011.01) |
| *B64G 1/10* | (2006.01) |

(52) U.S. Cl.
CPC ............. *B64G 1/22* (2013.01); *B64G 1/1021* (2013.01); *H04N 5/2354* (2013.01); *H04N 5/341* (2013.01); *B64G 2001/1028* (2013.01)

(58) Field of Classification Search
CPC .............................. B64G 1/22; B64G 1/1021; B64G 2001/1028; H04N 5/2354; H04N 5/341
See application file for complete search history.

(56) References Cited

U.S. PATENT DOCUMENTS

| | | | |
|---|---|---|---|
| 5,260,557 A | 11/1993 | Kissh et al. | |
| 2018/0157930 A1* | 6/2018 | Rutschman | .......... B64G 1/1021 |
| 2018/0239948 A1* | 8/2018 | Rutschman | .......... G06K 9/0063 |
| 2018/0239982 A1* | 8/2018 | Rutschman | ............ G06K 9/209 |
| 2018/0372548 A1* | 12/2018 | Gosian | .................... G01J 5/007 |

OTHER PUBLICATIONS

Abdelkhalik et al., "Space Surveillance with Star Trackers. Part II: Orbit Estimation", Paper AAS 06-232 of the 16th AAS/AIAA Space Flight Mechanics Meeting, Jan. 22-26, 2006, pp. 1-19, AIAA, Tampa, FL.

Ettouati et al., "Space Surveillance using Star Trackers. Part I: Simulations", Paper AAS 06-231 of the 16th AAS/AIAA Space Flight Mechanics Meeting, Jan. 22-26, 2006, pp. 1-15, AIAA, Tampa, FL.

(Continued)

*Primary Examiner* — Howard D Brown, Jr.
(74) *Attorney, Agent, or Firm* — Haynes and Boone, LLP

(57) ABSTRACT

According to an embodiment, a system includes a controller configured to determine a set of background light intensities associated with a satellite, where each background light intensity corresponds to at least one of an orientation and a position of a light source relative to the satellite, to determine a set of relative orientations of the light source corresponding to the set of background light intensities, and to generate an image of the satellite based, at least in part, on the determined set of background light intensities and the determined set of relative orientations of the light source.

21 Claims, 14 Drawing Sheets

(56) References Cited

OTHER PUBLICATIONS

Hughes Space and Communications News Release, "Camera sees giant Hughes satellite deploying its wings", Spaceflight Now, Feb. 24, 2000, 3 pages [online], [retrieved on Jan. 30, 2018]. Retrieved from the Internet: <URL: https://www.spaceflightnow.com/new/0002/24hs702arrays/>.

International Occultation Timing Association, "Introduction to Observing Occultations", Observing Basics, 3 pages [online], [retrieved on Jan. 30, 2018]. Retrieved from the Internet: <URL: http://occultations.org/observing/observing-basics>.

Malik, Tariq, "Wow! Shuttle and Space Station Photographed Crossing the Sun", Spaceflight, May 20, 2010, 5 pages [online], [retrieved on Jan. 30, 2018]. Retrieved from the Internet: <URL: https://www.space.com/8458-wow-shuttle-space-station-photographed-crossing-sun.html>.

Patterson, George, "ATS-6 Television Camera Reflector Monitor", IEEE Transactions on Aerospace and Electronic Systems, Nov. 1975, pp. 1202-1205, vol. AES-11—No. 6, IEEE, Piscataway, NJ.

Smith, Edward E., "Gray Lensman", 1951, p. 111 of 237, Pyramid Books, New York, NY.

Wikipedia, "ESTCube-1," 7 pages [online], [retrieved on Jan. 30, 2018]. Retrieved from the Internet: <URL: https://en.wikipedia.org/wiki/ESTCub-1#Scientific purpose>.

* cited by examiner

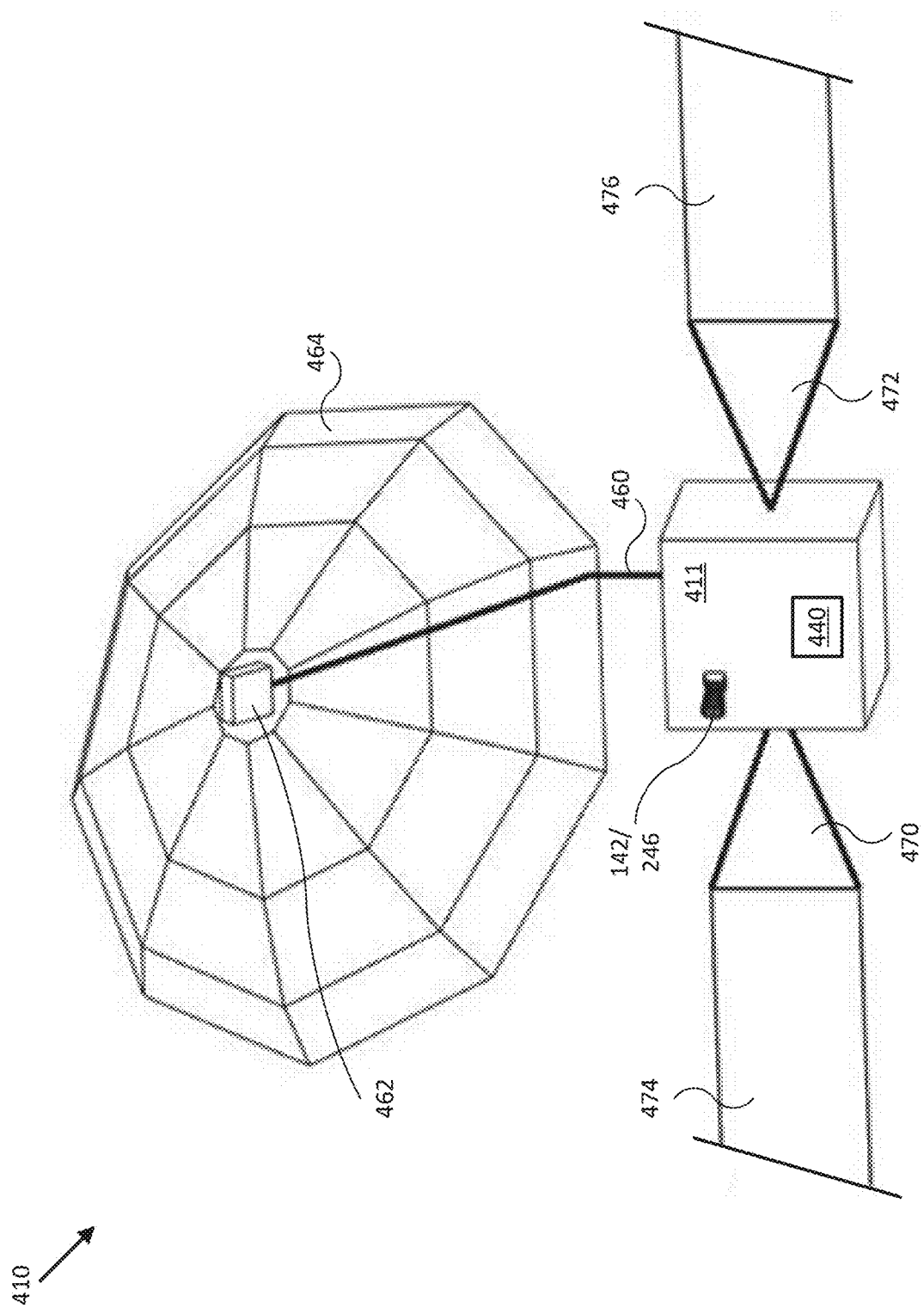

INDIRECT SELF-IMAGING SYSTEMS AND METHODS

GOVERNMENT LICENSE RIGHTS

This invention was made with United States Government support. The government has certain rights in the invention.

TECHNICAL FIELD

One or more embodiments of the invention relate generally to self-imaging systems and more particularly, for example, to systems and methods for generating indirect self-imagery of an object.

BACKGROUND

Spaceborne sensor and communications platforms, such as unmanned space satellites, are typically volume and mass limited due to the size and thrust limitations of related space/orbital launch vehicles. As such, space satellites tend to allocate volume and mass to their primary mission and often do not have excess space for dedicated optical self-monitoring systems, such as additional cameras and camera booms to position and aim a camera back at the satellite and monitor various aspects of its own operational status, such as deployment of solar panels, antennas, or heat radiators, mechanical damage caused by micrometeorite impacts and/or launch problems, and the evolution of such operational status over time. In addition to the general dearth of positive publicity opportunities, lack of such monitoring and a known and reliable operational status can lead to a number of different types of premature mission failure. Thus, there is a need in the art for methodologies to reliably generate self-imagery of an object, particularly in situations where manual intervention and monitoring is expensive or impossible, as is the case with almost all unmanned space satellites.

SUMMARY

Indirect self-imaging systems and related techniques are provided to improve the operation of unmanned spaceborne sensor or communication platforms. One or more embodiments of the described indirect self-imaging systems may advantageously include a controller configured to use sensor data identifying localized background or stray light intensities associated with a satellite, along with corresponding relative orientations of a light source (e.g., the Sun) impacting such sensor data, to generate an indirect self-image of the satellite, which may be in the nature of a silhouette of the satellite and/or portions of the satellite.

In one embodiment, a system includes a controller configured to determine a set of background light intensities associated with a satellite, where each background light intensity corresponds to at least one of an orientation and a position of a light source relative to the satellite, to determine a set of relative orientations of the light source corresponding to the set of background light intensities, and to generate an image of the satellite based, at least in part, on the determined set of background light intensities and the determined set of relative orientations of the light source.

In another embodiment, a method includes determining a set of background light intensities associated with a satellite, where each background light intensity corresponds to at least one of an orientation and a position of a light source relative to the satellite, determining a set of relative orientations of the light source corresponding to the set of background light intensities, and generating an image of the satellite based, at least in part, on the determined set of background light intensities and the determined set of relative orientations of the light source.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4A illustrates a diagram of an optical sensor for an indirect self-imaging system including a mobile platform in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
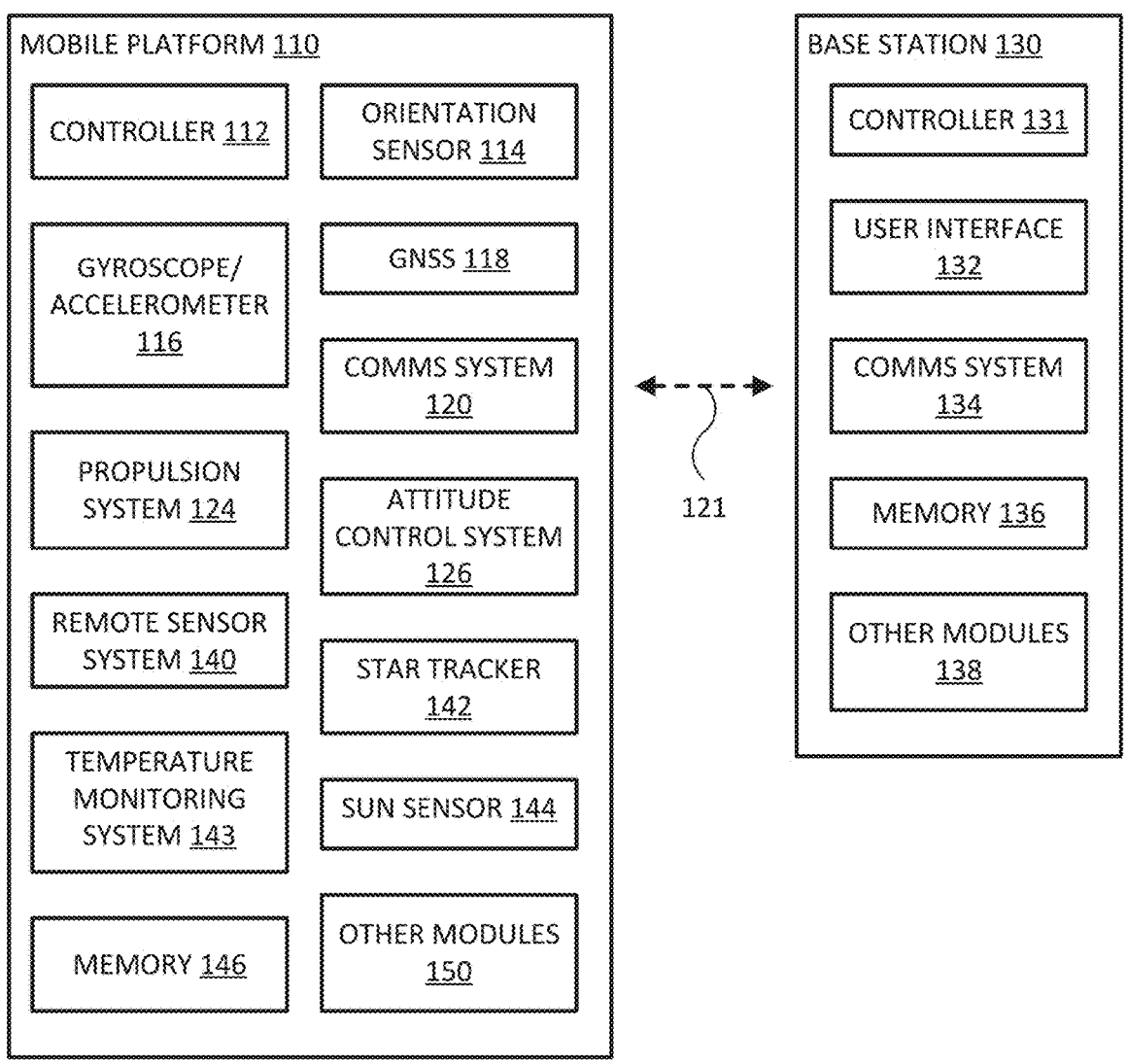
FIG. 1 illustrates a block diagram of an indirect self-imaging system in accordance with an embodiment of the disclosure.

Indirect self-imaging systems and related techniques are provided to improve the operational flexibility and reliability of unmanned mobile platforms generally, and spaceborne platforms specifically. An indirect self-imaging system may advantageously include a controller configured to use sensor data identifying localized background light intensities associated with a satellite, along with corresponding relative orientations of a light source (e.g., the Sun) impacting or influencing such sensor data, to generate an indirect self-image of the satellite. Such sensor data may be provided and processed in real time to provide self-imagery, for example, or may be retrieved from operational data collected previously (e.g., such as in general telemetry data provided over the course of general operations for many/most satellites) and processed to provide historical self-imagery, both as described herein.

As noted herein, unmanned spaceborne mobile platforms, also referred to as unmanned satellites, typically are not implemented with self-imaging systems because the weight, complexity, and size costs are detrimental to the primary mission of the satellite, such as providing infrared monitoring of the surface of the earth, for example, or providing a reliable relay for communications between points on the surface of the earth. Embodiments of the present disclosure address this lack without adding additional weight or size to an unmanned satellite by leveraging sensor data already provided by sensors commonly included in most unmanned satellites, along with typically provided telemetry data regarding the position and orientation of the satellite, to generate the self-imagery.

For example, many satellites are implemented with a star tracker, which is an optical sensor that captures celestial images of stars and/or constellations, processes the captured celestial images to identify particular stars or constellations in the celestial images, and, based on the view of the identified stars and/or constellations, determines and/or provides sensor data allowing other devices or computing resources to determine at least an orientation of the satellite (e.g., relative to a known star catalog). Star tracking typically requires resolving extremely faint light from stars, and star tracking performance can be negatively affected if any appreciable direct or even indirect sunlight reaches the imaging sensor of the star tracker. Star trackers generally include a lightshade or light shield centered about the star tracker's field of view (FOV) that is designed to ensure than when the sun or reflective satellite structure is outside a stray light "stayout zone" associated with the geometry of the light shield (e.g., and generally larger than the FOV of the star tracker), stray or background light levels are low enough that the star tracker can reliably and accurately determine the presence and position of stars in its FOV.

Star trackers are almost universally coupled to a satellite so as to not include any portion of the deployed satellite (e.g., including antenna, solar cells, and/or other sensor booms) in either its FOV or stayout zone. As an example, a star tracker may have a FOV radius of 4-6 degrees about its boresight and a stayout zone of 30 degrees radius about its boresight. More generally, light shields are typically designed to provide a stray light stayout zone of approximately 20-45 degrees radius about the boresight of the star tracker, depending on the FOV of the star tracker (e.g., which generally depends on the geometry of the imaging sensor and characteristics of any optical elements disposed between the imaging sensor and an imaged star field).

The star tracker is typically configured to minimize memory requirements to perform its tracking task, and so it typically does not store the full frame celestial images it captures, but it often does (and can be configured to) store a measurement of the background light intensity (e.g., corresponding to one or mare portions of the celestial image with no detectable stars in them) along with the measurements of the positions and/or intensities of identified stars used to determine the orientation of the satellite. In many instances, the pixel positions of the portions of the celestial image used to generate the background light intensity measurements are also stored. Such stored data is often transmitted to a base station (e.g., on the surface of the Earth), where it can be stored (along with other telemetry data) indefinitely without negatively impacting an operational status of the satellite.

Notwithstanding the techniques used to limit the effect of sunlight on the star tracking, it has been discovered that the background light intensity measurements reported by typical star trackers are measurably influenced by the relative position of the Sun (or any sufficiently strong light source) and the geometry of the satellite as presented to the Sun, due at least in part to a combination of occlusion and scattering of sunlight off of portions of the satellite, the light shield, and optical elements within the star tracker. Embodiments of the present disclosure have been used to retrieve and process historical star tracker data and generate strikingly recognizable self-imagery of satellites that have been in orbit for years.

In another example, many satellites are implemented with other sensors that produce sensor data that is similarly influenced by the relative orientation of the Sun, either relative to the satellite or relative to the sensor (e.g., the orientation and/or position of the sensor within the satellite is typically known and can be used to convert relative orientations of the Sun from one coordinate frame to another). For example, many satellites are implemented with a temperature monitoring system that includes a number of different temperature sensors (e.g., thermocouples, thermistors, bolometers, and/or other temperature sensors) distributed throughout a satellite. Temperature data from such sensors, coupled with the relative orientation of the sun (e.g., which tends to heat at least the surface of the satellite in sunlight, and cool the surface of the satellite in shadow), may be used to generate self-imagery of the satellite. More specifically, heating or cooling of specific portions of the surface of the satellite may depend on the angle of incidence of the sunlight, in addition to being in view of sunlight or in shadow, and the variations can be used to generate self-imagery of the satellite. Similar techniques may be used separately, or in combination, with sun sensors (e.g., deep space sensors used to track the Sun, or other devices that can be used to track the relative position of the sun, such as solar panels).

FIG. 1 illustrates a block diagram of indirect self-imaging system 100 in accordance with an embodiment of the disclosure. In some embodiments, system 100 may be configured to orbit a planet or the sun, travel through deep space, or otherwise enter space as is typical with a space satellite used for planetary science or communications. Various types of sensor data may be processed (e.g., by mobile platform 110 and/or base station 130) to generate imagery, displayed to a user through use of user interface 132 (e.g., one or more displays such as a multi-function display (MFD), a portable electronic device such as a tablet, laptop, or smart phone, or other appropriate interface), and/or stored in memory for later viewing and/or analysis. In various embodiments, system 100 may be configured to use such sensor data and/or imagery to control operation of platform 110, remote sensor system 140, star tracker 142, and/or sun sensor 144, as described herein, such as controlling propulsion system 124 and/or attitude control system 126 to move or reorient platform 110 to a desired position or orientation in orbit or deep space or relative to a target.

In the embodiment shown in FIG. 1, indirect self-imaging system 100 includes (space) platform 110 configured to communicate wirelessly over wireless communications link 121 to base station 130, and at least one of remote sensor system 140, star tracker 142, temperature monitoring system 143, and sun sensor 144. Platform 110 may be a mobile platform configured to move and position and/or aim remote sensor system 140 (e.g., relative to a designated or detected target), for example. As shown in FIG. 1, platform 110 may also include one or more of a controller 112, an orientation sensor 114, a gyroscope/accelerometer 116, a global navigation satellite system (GNSS) 118, a communications system 120, a propulsion system 124, an attitude control system 126, a memory 146, and other modules 150. Operation of platform 110 may be substantially autonomous and/or partially or completely controlled by optional base station 130, which may include one or more of a user interface 132, a communications system 134, and other modules 138. In general, remote sensor system 140 may be coupled to platform 110 and be configured to capture sensor data (e.g., visible spectrum images, infrared images, narrow aperture radar data, and/or other sensor data) and/or relay communications with respect to a target position, area, and/or object(s) as selected and/or framed by operation of platform 110 and/or base station 130.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing sensor data, sensor signals, and/or imagery, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or remote sensor system 140. Controller 112 may also be configured to substantially continuously monitor and/or store the status of platform 110 and/or sensor data provided by one or more elements of platform 110 and/or base station 130, such as the position and/or orientation of platform 110, remote sensor system 140, and/or base station 130, for example.

Orientation sensor 114 may be implemented as one or more of a compass, float, accelerometer, electronic sextant, optical encoder, resolver, inductosyn, potentiometer, and/or other device capable of measuring an orientation of platform 110 (e.g., magnitude and direction of roll, pitch, and/or yaw, relative to one or more reference orientations), remote sensor system 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, DORIS, and/or Galileo based receiver and/or other device capable of determining absolute and/or relative position of platform 110 (e.g., or an element of platform 110) based on wireless signals received from spaceborne and/or terrestrial sources, for example, and capable of providing such measurements as sensor signals and/or data that may be communicated to various devices of system 100. In some embodiments, GNSS 118 may be used to provide an absolute orbital position and/or altitude. In various embodiments, GNSS 118 may be used to provide an absolute time stamp (e.g., as an external clock) for other sensor data provided by elements of system 100, or to calibrate one or more internal clocks to platform 110 and/or base station 130 (e.g., implemented within controller 112 and/or 131).

Communications system 120 may be implemented as any wired and/or wireless communications system configured to transmit and receive analog and/or digital signals between elements of system 100. For example, communications system 120 may be configured to receive flight control signals and/or data from base station 130 and provide them to controller 112 and/or propulsion system 124 and attitude control system 126. In other embodiments, communications system 120 may be configured to receive images and/or other sensor information (e.g., visible spectrum and/or infrared still images or video images) from elements of platform 110 and relay the sensor data to controller 112 and/or base station 130. In some embodiments, communications system 120 may be implemented with a parabolic antenna configured to support multiple simultaneous communications channels between elements of system 100. Wireless communication link 121 may include one or more analog and/or digital radio or optical communication links, as described herein, and may be direct communication links established between elements of system 100, for example, or may be relayed through one or more wireless relay stations (e.g., other satellites or base stations) configured to receive and retransmit wireless communications. Regardless, communication links established by communications system 120 may be configured to transmit data between elements of system 100 substantially continuously throughout operation of system 100, where such data includes various types of sensor data, control parameters, and/or other data, as described herein.

Propulsion system 124 may be implemented as one or more chemical, compressed gas, ion, and/or other thrust-based propulsion systems, and/or other types of propulsion systems that can be used to provide motive force to platform 110 and/or to steer or reorient platform 110 in space, according to control signals provided by controller 112 and/or base station 130. Attitude control system 126 may be implemented as one or more thrusters, momentum wheels, reaction wheels, control moment gyros, and/or other attitude control actuators that can be used to reorient and/or stabilize platform 110 in space, according to control signals provided by controller 112 and/or base station 130.

In embodiments where remote sensor system 140 is implemented as an imaging system, remote sensor system 140 may include one or more imaging modules, which may be implemented as cooled and/or uncooled arrays of detector elements, such as visible spectrum, infrared, ultraviolet, and/or other electromagnetic spectrums or subsets of such spectrums, sensitive detector elements that can be arranged in a focal plane array or assembly. In various embodiments, remote sensor system 140 may be configured to perform any of the operations or methods described herein, at least in part, or in combination with controller 112 and/or base station 130. In other embodiments, remote sensor system 140 may include one or more radar assemblies configured to detect range and/or approach angle of other objects in space or in an atmosphere.

Star tracker 142 may be implemented as any imaging system configured to capture and provide celestial images associated with platform 110, such as celestial images including stars and/or constellations that may be used to track an orientation of platform 110, for example, and celestial images including information about background light intensities associated with platform 110, as described herein. More detail with respect to star tracker 142 is provided in FIG. 2A.

Temperature monitoring system 143 may be implemented as a plurality of temperature sensors placed at known positions on and/or within platform 110 and configured to measure a corresponding plurality of temperatures of platform 110 and/or elements of platform 110 to facilitate operation of platform 110. For example, one temperature sensor may be configured to measure operation of propulsion system 124, and another temperature sensor may be configured to measure operation of attitude control system 126. Sun sensor 144 may be implemented as an optical sensor, solar panel, or other sun sensor configured to measure a relative position of the Sun, relative to a coordinate frame of sun sensor 144 and/or platform 110. In some embodiments, sun sensor 144 may be configured to provide background light intensities and/or relative positions of the Sun or another light source, as described herein. In various embodiments, a sun sensor may be implemented as a cosine detector that provides sunlight intensity measurements directly (e.g., scaled by cosine losses and biased by surface reflection losses).

Memory 146 may be implemented as one or more machine readable mediums and/or logic devices configured to store software instructions, sensor signals and/or data, control signals, operational parameters, calibration parameters, images, and/or other data facilitating operation of system 100, for example, and provide it to various elements of system 100.

Other modules 150 may include other and/or additional sensors, actuators, communications systems/nodes, and/or active illumination devices, for example, and may be used to provide additional environmental information related to operation of platform 110, for example. In some embodiments, other modules 150 may include a radar system, a proximity sensor, a visible spectrum camera or infrared camera, an irradiance detector, and/or other environmental sensors providing measurements and/or other sensor signals that can be displayed to a user and/or used by other devices of system 100 (e.g., controller 112) to provide operational control of platform 110 and/or system 100.

In other embodiments, other modules 150 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 150 may include an articulated illumination device that may be used to provide a known background light intensity, which may be measured by one or more of remote sensor system 140, star tracker 142, and/or sun sensor 144.

Controller 131 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110, base station 130, and/or other elements of system 100, for example. Such software instructions may also implement methods for processing sensor data, sensor signals, and/or imagery, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 131. In these and other embodiments, controller 131 may be implemented with other components where appropriate, such as volatile memory, non-volatile memory, one or more interfaces, and/or various analog and/or digital components for interfacing with devices of system 100. For example, controller 131 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 131 may be integrated with one or more other elements of base station 130, for example, or distributed as multiple logic devices within platform 110 and/or base station 130. Controller 131 may also be configured to substantially continuously monitor and/or store the status of platform 110 and/or sensor data provided by one or more elements of platform 110 and/or base station 130, such as the position and/or orientation of platform 110, remote sensor system 140, and/or base station 130, for example.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications system 134 of base station 130) to other devices of system 100, such as controllers 112 and/or 131. User interface 132 may also be implemented with one or more logic devices (e.g., similar to controller 131) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of control signals, sensor information, and/or other sensor and/or control signals. In some embodiments, user interface 132 may be adapted to accept user input including a user-defined target orientation for an element of system 100, for example, and to generate control signals to cause platform 110 to move according to the target orientation, or to aim remote sensor system 140 accordingly. In other embodiments, user interface 132 may be adapted to accept user input modifying a control loop parameter of controller 131, for example. In further embodiments, user interface 132 may be adapted to accept user input including a user-defined target attitude, orientation, and/or position for an actuated or articulated device (e.g., remote sensor system 140) associated with platform 110, for example, and to generate control signals for adjusting an orientation and/or position of the actuated device according to the target attitude, orientation, and/or position. Such control signals may be transmitted to controller 112 (e.g., using communications systems 134 and 120), which may then control platform 110 accordingly.

Communications system 134 may be implemented as any wired and/or wireless communications system configured to transmit and receive analog and/or digital signals between elements of system 100. For example, communications system 134 may be configured to transmit control signals from controller 131 and/or user interface 132 to communications system 120. In other embodiments, communications system 134 may be configured to receive sensor data (e.g., visible spectrum and/or infrared still images or video images, star tracker data, other telemetry data, and/or other sensor data) from platform 110. In some embodiments, communications system 134 may be implemented with a parabolic antenna configured to support multiple simultaneous communications channels between elements of system 100. Memory 136 may be implemented as one or more machine readable mediums and/or logic devices configured to store software instructions, sensor signals and/or data, control signals, operational parameters, calibration parameters, images, and/or other data facilitating operation of system 100, for example, and provide it to various elements of system 100.

Other modules 138 of base station 130 may include other and/or additional sensors, actuators, communications systems/nodes, and/or user interface devices, for example. In some embodiments, other modules 138 may include a radar assembly or system, a radio antenna, a visible spectrum camera, an infrared camera, a GNSS, and/or other sensors providing position or orientation measurements and/or other sensor signals that can be displayed to a user and/or used by other devices of system 100 (e.g., controllers 112 and/or 131) to provide operational control of platform 110 and/or system 100 or to process sensor data, for example.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, MIL-STD-1553, RS-422, RS-232, SpaceWire, IEEE 1355, or various long, medium, and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In various embodiments, one or more of the devices may be powered by a power source for platform 110, using one or more power leads. Such power leads may also be used to support one or more communication techniques between elements of system 100.

Figure 2A:
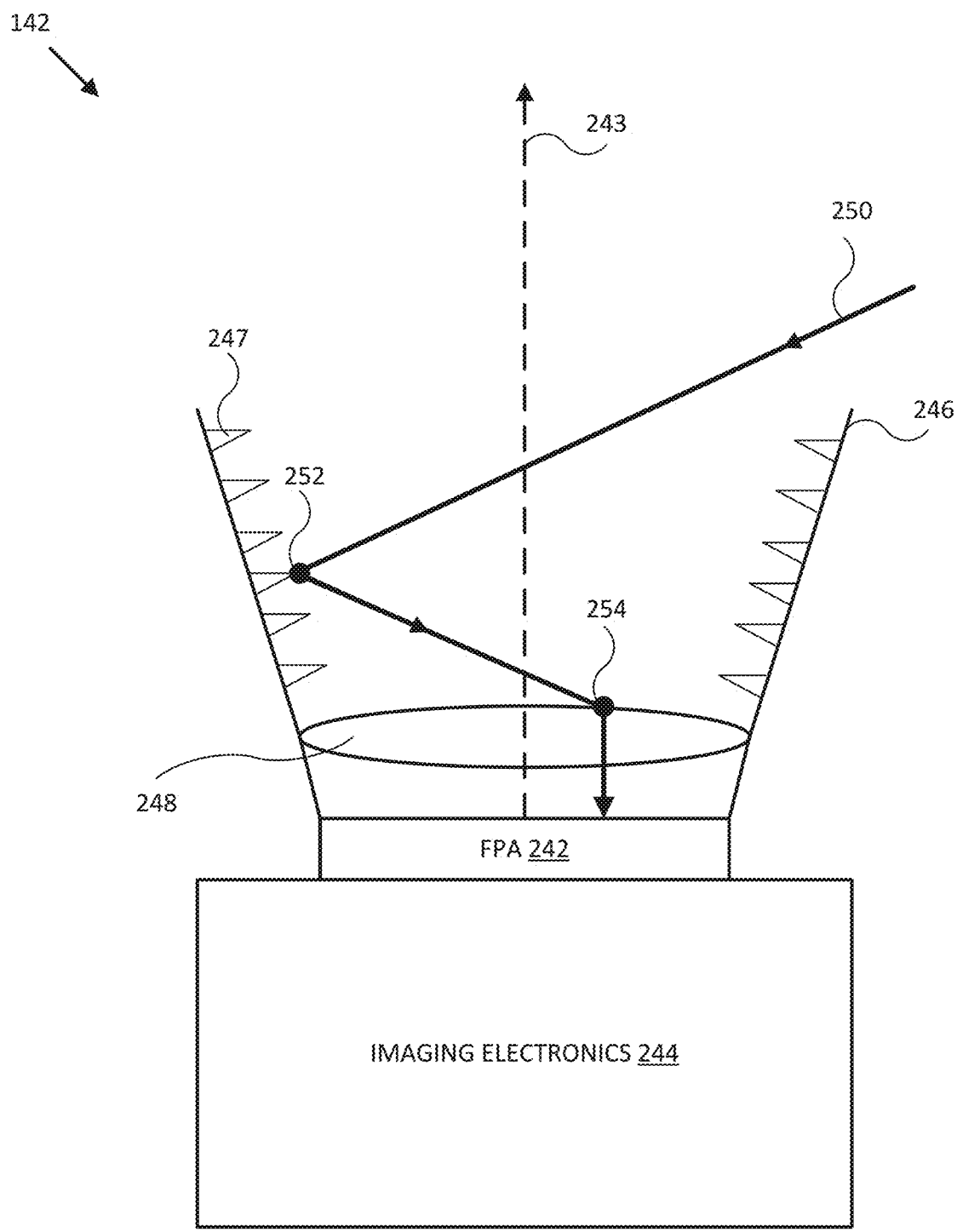
FIG. 2A illustrates a diagram of an optical sensor of an indirect self-imaging system in accordance with an embodiment of the disclosure.

FIG. 2A illustrates a diagram of an optical sensor/star tracker 142 of indirect self-imaging system 100 in accordance with an embodiment of the disclosure. In the embodiment shown in FIG. 2A, star tracker 142 includes focal plane assembly (FPA) 242, imaging electronics 244, light shield 246 with multiple knife edge light baffles (e.g., light baffle rings) 247, and optical elements 248. In embodiments where star tracker 142 is used to provide background light intensities associated with platform 110, oblique scattered or reflected sunlight 250 may enter light shield 246 and weakly scatter off of light baffle 247 at scatter point 252, travel to optical element 248 and weakly scatter off of optical element 248 at scatter point 254, and then enter and be detected by FPA 242, as shown. As such, the presence of oblique scattered or reflected sunlight 250 increases the background light intensity measured by FPA 242, and the amount of the measured increase is modulated by the relative position of the Sun, the geometry and/or surface reflectance of portions of platform 110 in sunlight and/or in shadow, a bias level of FPA 242 (e.g., related to black level and dark current of FPA 242), and a light shield attenuation function associated with light shield 246 of star tracker 142.

FPA 242 may be implemented as any imaging sensor including an array of light detectors sensitive enough to capture the light of distance stars and form a celestial image of a star field. Such light detectors may be sensitive to visible, infrared, ultraviolet, and/or other spectrums or subspectrums of light. Imaging electronics 244 may be implemented as a logic device similar to controller 112 and/or various analog interfaces to FPA 242 to control operation of FPA 242 and/or optical elements 248 to capture and provide celestial images of a star field, for example, to identify stars, constellations, and background light areas within such celestial images, and to determine an orientation of star tracker 142 based on the celestial images and a star catalog/map. Light shield 246 may be a roughly cone shaped light shield providing a 20-45 degree (radius) stray light stayout zone for star tracker 142 and supporting light baffles 247, which are rings around the inner portion of light shield 246 configured to minimize the presence and effect of scattered light entering light shield 246. Optical elements 248 may be implemented as a controllable iris or shutter and/or a lens configured to protect and/or focus light onto FPA 242, as shown.

In general, imaging electronics 244 of star tracker 142 may be configured to provide a background light intensity by capturing a celestial image at FPA 242, identifying positions of stars within the celestial image by the relatively high magnitude and narrow shape of their light intensities, and identifying background light areas within the celestial image by the relatively low and broad or flat shape of their light intensities. In various embodiments, imaging electronics 244 may provide a background light intensity corresponding to a single celestial image. The background light intensity may be an average of a single localized pixel area designated as background light in the celestial image (e.g., an average of the light levels of those pixels in the designated localized pixel area). In other embodiments, imaging electronics 244 may provide a background light intensity, corresponding to a single celestial image, that is an average of multiple localized pixel areas designated as background light in the celestial image, for example, or that is a set of multiple background light intensities determined at different localized pixel positions. In various embodiments, such background light intensities may be on the order of several hundred photoelectrons detected by FPA 242 over an image capture period of star tracker 142 (which may be adjusted to increase sensitivity or to minimize blurring caused by motion of platform relative to a star field, for example).

Imaging electronics 244 of star tracker 142 may also be configured to adjust operation of star tracker 142 to generate a higher rate of background light intensities. For example, imaging electronics 244 may in some embodiments be configured to average five frames of celestial image data to determine background light intensity, and may in other embodiments be programmed/configured to provide raw data (e.g., single frame data), such as raw pixel dumps, which may be used to determine background light intensity and/or characterize stray light gradation to increase resulting indirect self-imagery contrast, as described herein.

Many star trackers provide a "bright object flag" indicating relatively high stray light levels, such as when the Sun/Moon/Earth/other light source directly illuminates a portion of optical element 248 and/or FPA 242. Under such circumstances, the bright object flag may indicate that little or no structure of platform 110 is occluding stray or direct light reaching FPA 242 and/or light shield 246, which would tend to increase the measured background light intensity (e.g., if the measurement does not fail due to too much incident light).

Such bright object flag can itself be used as a background light intensity indicator (e.g., a Boolean background light intensity), which can itself be used to generate a self-image. For example, in some embodiments, system 100 may be configured to generate a Boolean self-image by mapping background light intensities to "one" when the bright object flag is toggled "on" and "zero" when the bright object flag is toggled "off" (e.g., or the negative of such image). More generally, star tracker 142 may be configured to report the status of such a bright object flag (e.g., as part of a measured or failed measurement of background light intensity).

Background light intensities measured while the bright object flag is toggled "on" (e.g., indicating sufficient stray light levels such that tracking faint stars may be problematic, for example, or indicating a direct line of sight from optical elements 248 and/or FPA 242 to a relatively bright light source such that measuring background light intensities may be problematic or impossible) may be left unchanged (e.g., subject to one or more corrections, as described herein), for example, or may be mapped to a preset value, such as a "nominal" background light intensity, or a "maximum" background light intensity, which may be used to help increase the contrast and/or dynamic range of a resulting self-image. For example, full scale background light intensities may be detected and left unchanged or may be mapped to a preset value when generating a self-image, as described herein. In various embodiments, a "nominal" or "maximum" background light intensity may be pre-selected by a user, for example, or may be set as the median or average (nominal) or maximum of a range of background light intensities measured over a period of time and/or while the bright object flag is toggled "off" (e.g., indicating that the light source is substantially occluded by structure of platform 110 and/or light shield 246). In such embodiments, the range of measured background light intensities used to set the nominal or maximum background light intensity may be selected to be those associated with relative orientations of the light source within a particular angular range of the stayout zone or FOV associated with star tracker 142, such as within 10 degrees or within 30 degrees (e.g., but outside) of the stayout zone or FOV for star tracker 142.

Under typical conditions (e.g., when the bright object flag is toggled "off"), the measured background light intensity provided by star tracker 142 includes both the light intensities associated with the celestial sky region of measurement and the contribution of oblique scattered or reflected sunlight 250, in addition to other bias and scale contributions described herein. However, the modulation of the increase in the background light intensity due to presence and magnitude of oblique scattered sunlight 250, caused by the relative orientation of a strong light source, such as the Sun, to the orientation of platform 110, is by itself sufficient to generate imagery in which the outline of the structure of platform 110 and reflections off surfaces of platform 110 can be seen (e.g., subject to the relative location and orientation of star tracker 142). Bias and scale corrections, surface reflectance corrections, and/or other corrections may be used to increase contrast within the generated image, or to help increase the perceived signal to noise, but such corrections are unnecessary to generate recognizable self-imagery of a satellite, such as platform 110. Also, while oblique scattered sunlight 250 typically only exists when the relative elevation of the Sun or other strong light source is within 90 degrees of the central axis/boresight 243 of light shield 246/the field of view of star tracker 142 (e.g., a hemisphere centered on such axis), structure and/or reflective surfaces of platform 110 may reflect light that itself generates oblique scattered sunlight 250, even when the relative elevation to the light source is larger than 90 degrees.

An example of an additional correction that may be used to help increase contrast and/or other image characteristics is a viewpoint correction. For some self-imagery, it is not necessary to know where the effective view point of the generated image is: the modulation of the light due to the relative orientations of the light source and the structure of platform 110 is sufficient to provide a recognizable self-image of platform 110. However, it should be understood that each background light measurement, or each pixel of a resulting image, has its own corresponding effective view point that depends on the relative orientation of the light source and how light 250 from the light source interacts with light shield 246. For many applications, the effective viewpoint, and the viewpoint correction derived therefrom, can be important, such as when determining the location of a deployed satellite element from a self-image, or using triangulation to form a three dimensional model of platform 110.

An acceptable first approximation of the effective viewpoint for the common case, where light shield 246 and optical elements 248 are substantially cylindrically symmetric and the primary light source is the Sun, is a point on boresight 243 of star tracker 142 at a height above FPA 242 equal to the vertical offset of the outermost baffle ring 247, which may be referred to as the light shield height effective viewpoint. A second and more accurate approximation of the effective view point, under similar element geometry symmetry constraints, is a point along boresight 243 that varies with the elevation angle (but not the azimuth angle) of the Sun, which may be referred to as the elevation variable effective viewpoint.

To compute the distance of the elevation variable effective viewpoint from optical elements 248 (e.g., a lens) as a function of light source elevation, first compute the scatter coupling of each point of light shield 246 illuminated by the light source at the light source elevation angle. For example, at sufficiently oblique elevation angles, sunlight 250 may only illuminate a portion of baffles 247 (e.g., portions of the top two or three baffle rings 247) of light shield 246. The scatter coupling calculation can be performed using a stray light analysis tool or by analytic computation, for example, and results in a scalar value that acts as an attenuation scale factor. Because of the cylindrical symmetry assumption, each illuminated point of light shield 246 has a twin point with the same scatter coupling to FPA 242 with a position that is a mirror image in the plane formed by the input light vector (e.g., sunlight 250) and boresight 243, at the same distance from that plane as the first illuminated point.

After computing the scatter coupling of each point of light shield 246 illuminated by the light source at the light source elevation angle, for each twin points with the same scattering coupling, find the intersection of a line segment connecting the set of twins with the plane defined by boresight 243 and light vector 250, and project a line from that first intersection point along the negative direction of light vector 250 to find a second intersection point of that line with boresight 243. Compute the product of the distance of that second intersection point on boresight 243 from optical elements 248 with the calculated scatter coupling of the twin set of illuminated points, sum the coupling-distance product over all of the illuminated points, and divide the first sum by a second sum of the scatter coupling factors of the illuminated points, to find the distance from optical elements 248 along boresight 243 that is the optical centroid of the scattered/background/stray light from the light source to FPA 242. The elevation variable effective viewpoint in this case is this optical centroid, and the position of the centroid will vary with sun elevation.

A third yet more accurate approximation can be used to account for star tracker elements that are not cylindrically symmetrical. In particular, the locations on FPA 242 used to compute the stray/background light intensity for any single light intensity measurement are unlikely to be cylindrically symmetrical. One approach in this case is to define a computational plane perpendicular to light vector 250 that contains a convenient point on boresight 243, such as the light shield height effective viewpoint or the elevation variable effective viewpoint. For each illuminated point on light shield 246, find the point on that plane where the line connecting the illuminated point and the center of the light source intersects the computational plane. Weight that point by the scatter coupling factor from the illuminated point to the point (or set of points) where the background light is measured. Find the centroid in the computational plane of all of these weighted illuminated points, which is the effective viewpoint for that light source azimuth and elevation, and which may be referred to as the elevation and azimuth variable effective viewpoint. Note that this third approximation is very general; it can be used when the light detector is not an FPA, optical elements 248 do not use lenses, the star tracker elements are not cylindrically symmetrical, etc.

Regardless of the approximation used, or the resulting determined effective viewpoint, such viewpoint correction may include contrast related refinements related to correcting background light measurements according to the scatter coupling determined for each illuminated point (e.g., similar to the light shield attenuation function), and spatial refinements related to using the effective viewpoint to determine the directional vector from the effective viewpoint to the structure imaged by the pixel, which can be measurably different from the relative orientation of the light source. For example, such spatial refinements or corrections may be used to more accurately determine a distance from star tracker 142 to a particular imaged structure (e.g., a partially deployed solar panel or antenna), which can help determine whether the structure has deployed properly and to what extent, where damage has occurred along a portion of the structure, and/or other spatial operational status of platform 110.

Figure 2B:
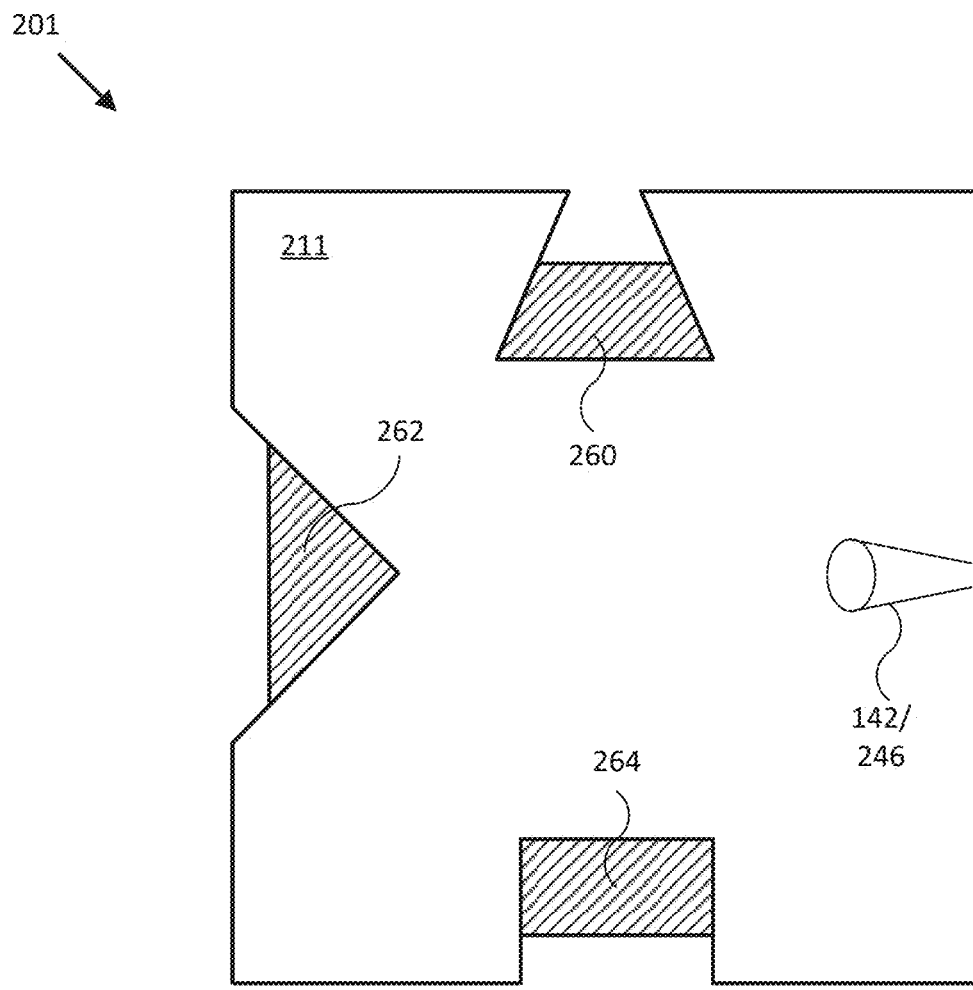
FIG. 2B illustrates a diagram of an optical sensor of an indirect self-imaging system placed on a mobile platform in accordance with an embodiment of the disclosure.
Figure 2B:
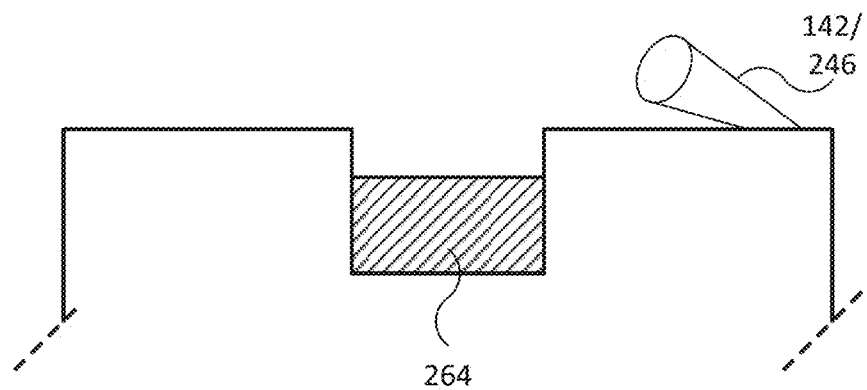

FIG. 2B illustrates a diagram 201 (e.g., a top and partial side view) of optical sensor/star tracker 142 of indirect self-imaging system 100 placed on platform 110 in accordance with an embodiment of the disclosure. In the embodiment shown in FIG. 2B, platform (e.g., CubeSat or Cube Satellite) 210 includes star tracker/light shield 142/246 aimed obliquely along a top surface 211 of platform 210, where three surface elements 260, 262, and 264 of platform 210 are substantially within the hemispherical scattered light detection zone of star tracker/light shield 142/246 (e.g., a hemisphere centered on the central axis of light shield 246). As such, imagery generated by background light intensities provided by star tracker 142 may include image structure sufficient to differentiate the shape of each surface element 260, 262, and 264 from each other. With sufficient contrast (e.g., provided by corrections if necessary), or if the surface textures/reflectance of surface elements 260, 262, and 264 are sufficiently physically differentiated (e.g., shiny vs. dull, or reflective vs. absorptive), imagery generated by background light intensities provided by star tracker 142 will include image pixel intensity detail sufficient to differentiate the surface type of each surface element 260, 262, and 264 from each other.

Figure 2C:
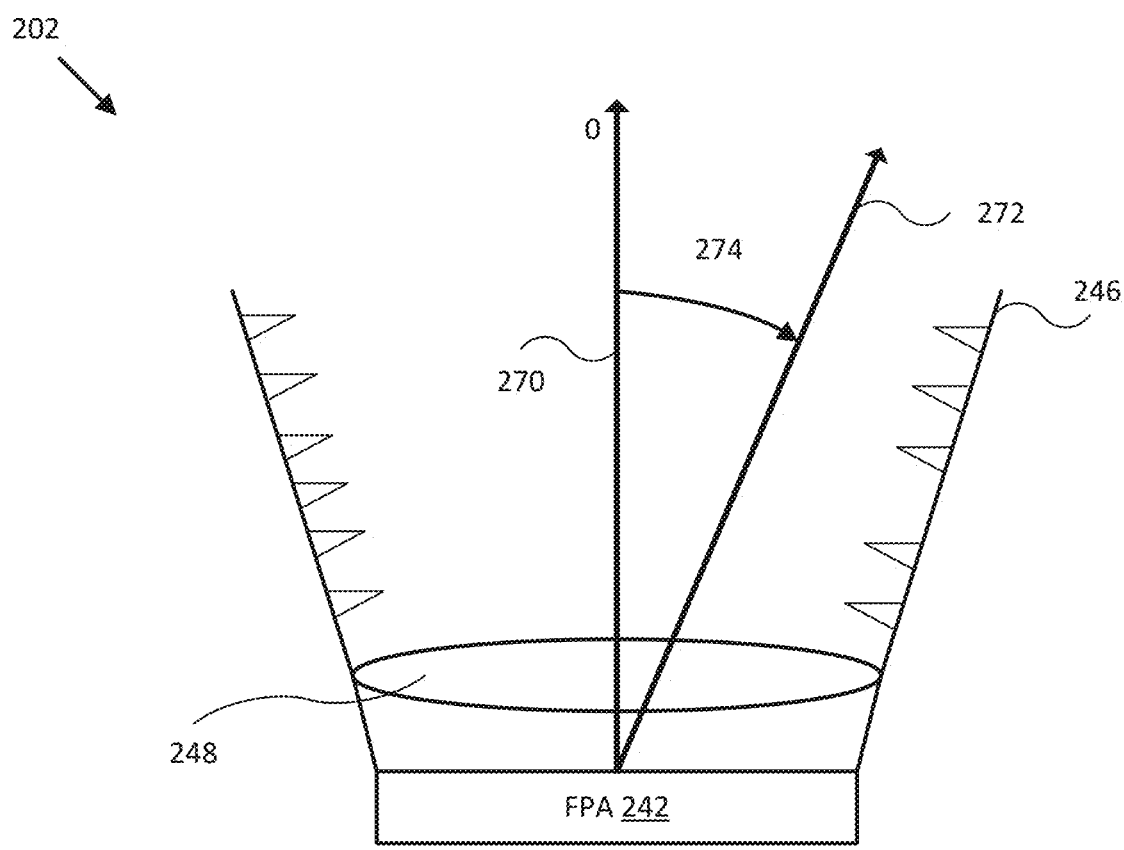
FIG. 2C illustrates a coordinate frame and/or system for an optical sensor of an indirect self-imaging system in accordance with an embodiment of the disclosure.
Figure 2C:
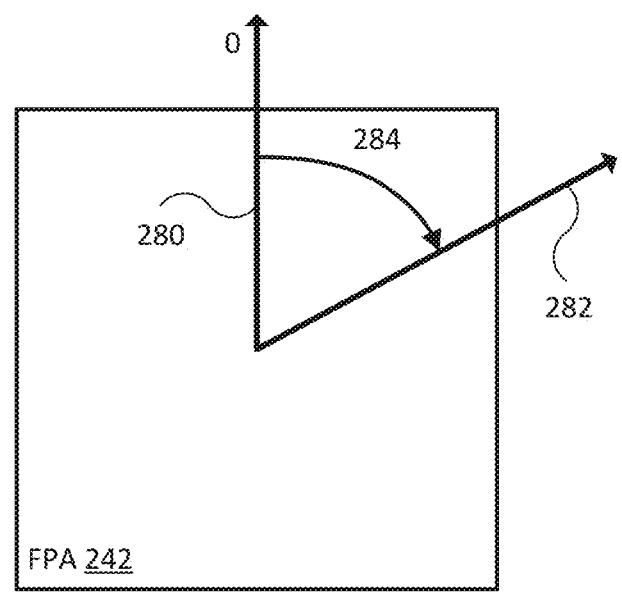

In order to generate such images, a mapping or plotting standard can be helpful. FIG. 2C illustrates a coordinate frame and/or system for optical sensor/star tracker 142 of indirect self-imaging system 100 in accordance with an embodiment of the disclosure that provides one example mapping or plotting standard. In FIG. 2C, line segment 270 represents the normal vector/central axis of FPA 242 of star tracker 142, line segment 272 represents the direction to a light source (e.g., the Sun), and angle 274 represents the relative elevation (0-180 degrees, also referred to as the polar angle) of the light source (e.g., relative to star tracker 142). Likewise, line segment 280 represents the selected reference direction of FPA 242 of star tracker 142, line segment 282 represents the direction to a light source (e.g., the Sun) in the plane of FPA 242, and angle 284 represents the relative azimuth (0-360 degrees) of the light source (e.g., relative to star tracker 142). Such coordinate system is typically referred to as a spherical coordinate system projected onto the celestial sphere. Imagery may be generated from background light intensities by mapping the relative elevations and azimuths to a two dimensional plot, such as a Mercator or cylindrical projection onto a two dimensional plane. Other projections may be used to reduce perceived spatial warping within the generated image.

In addition, typically the coordinate transformation between the reference frame for star tracker 142 (e.g., or remote sensor system 140, or sun sensor 144) and a reference frame for platform 110 (e.g., defined by or selected according to a shape of platform 110, a distribution of temperature sensors of temperature monitoring system 143, and/or a measurement reference frame of orientation sensor 114) is known, and so a relative orientation of a light source known in one coordinate frame is determinable for another coordinate frame through the known coordinate transformation.

Figure 3A:
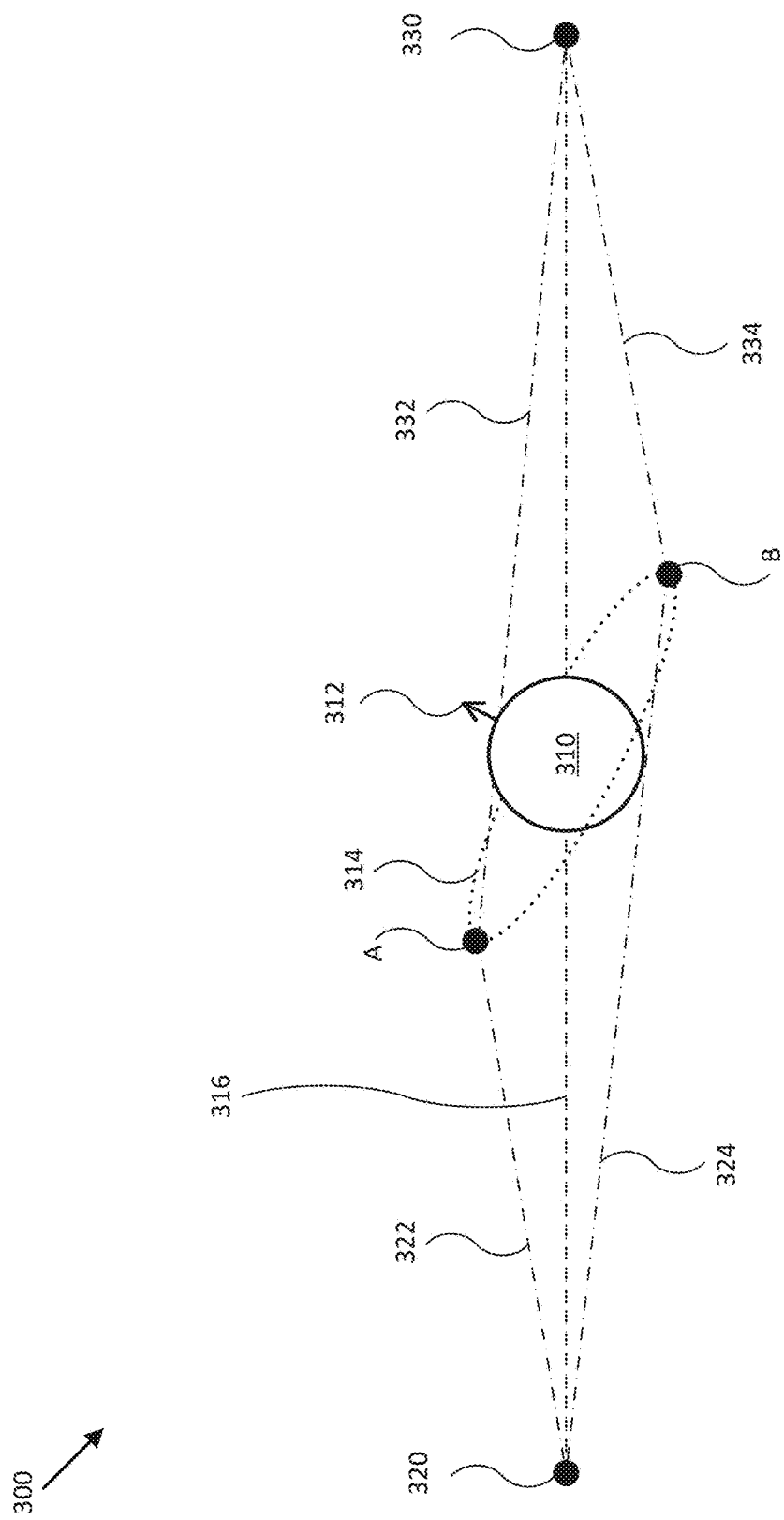
FIG. 3A illustrates a diagram of a planetary orbit for a mobile platform including an indirect self-imaging system in accordance with an embodiment of the disclosure.
Figure 3B:
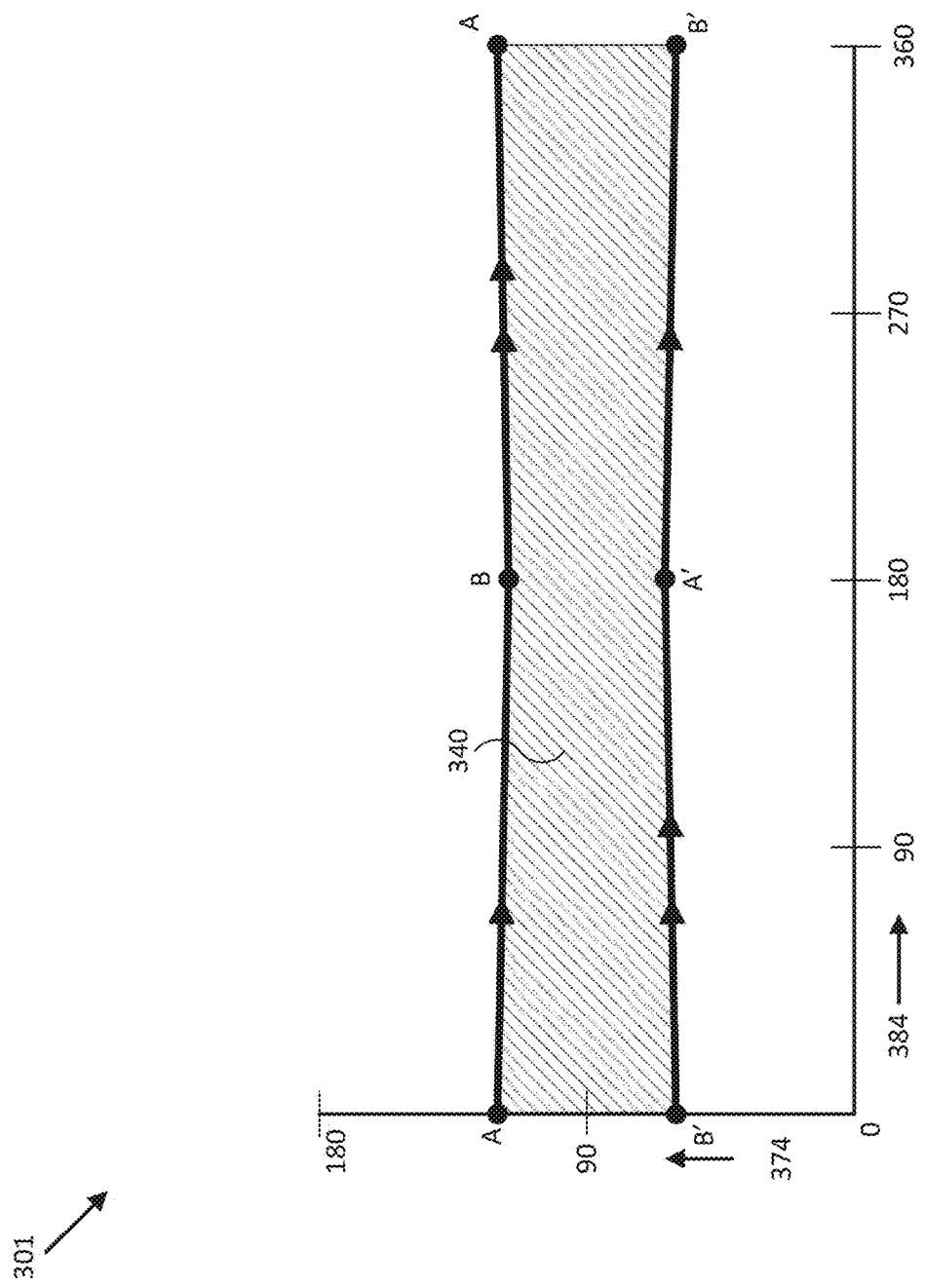
FIG. 3B illustrates a graph of relative orientations and/or positions of the Sun, relative to a planetary orbit for a mobile platform including an indirect self-imaging system in accordance with an embodiment of the disclosure.
Figure 3C:
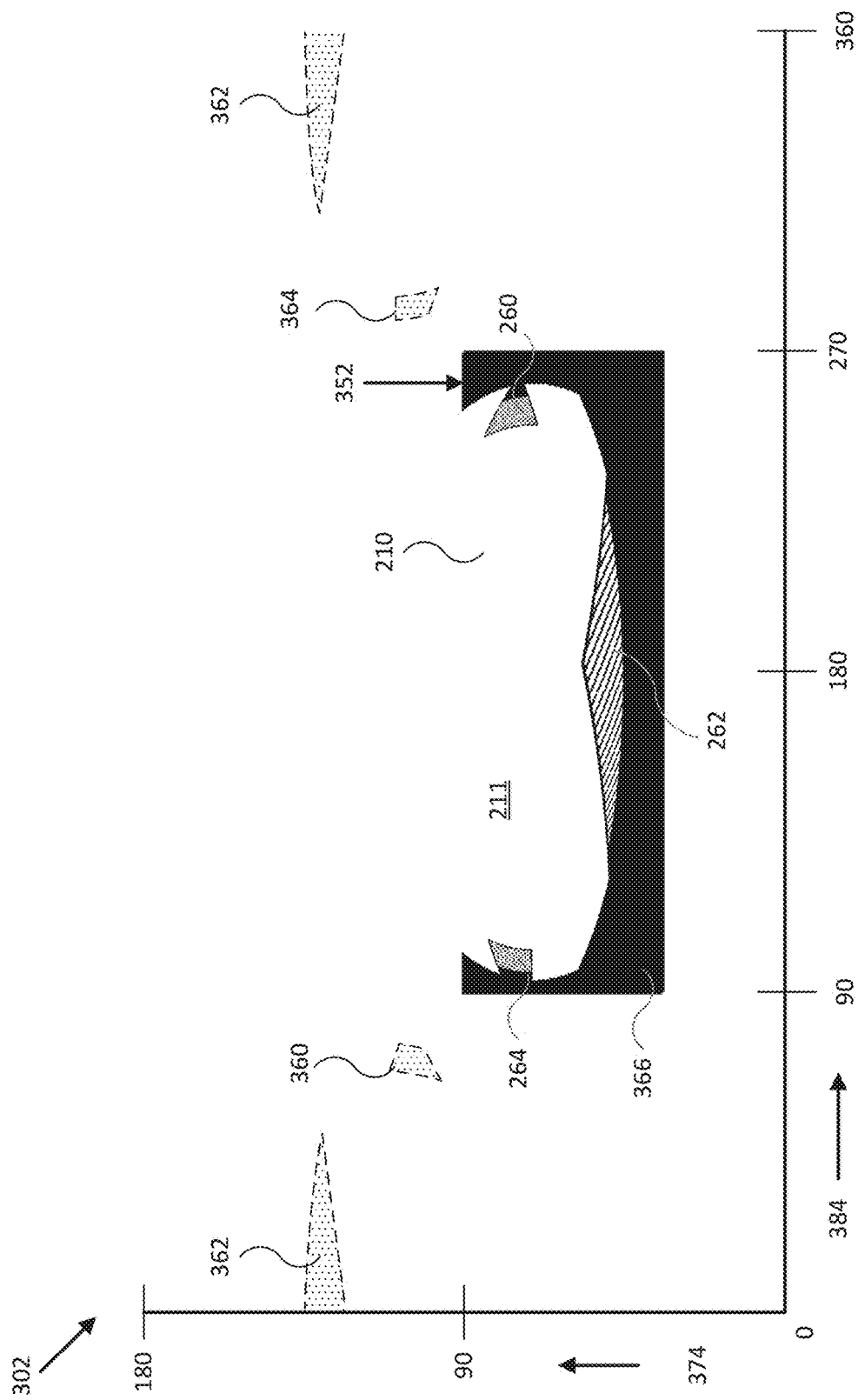
FIG. 3C illustrates an image of a mobile platform generated by an indirect self-imaging system of the mobile platform in accordance with an embodiment of the disclosure.

FIG. 3A illustrates a diagram 300 of a planetary orbit 314 for mobile platform 110 (e.g., including an indirect self-imaging system 100) in accordance with an embodiment of the disclosure, which with FIGS. 3B-C illustrates typical mappings of relative orientations (e.g., elevation and azimuth) of a light source, and in particular, the Sun (note, lengths in FIG. 3A are not to scale). In FIG. 3A, geostationary orbit 314 for platform 110 about Earth 310 is shown. Vector 312 shows the tilt of the Earth's rotational axis relative to the ecliptic 316. Sun position 320 shows the relative position of the Sun (e.g., a light source) at day zero, and Sun position 330 shows the relative position of the Sun at approximately day 182. It is assumed for this example that star tracker 142 is pointing in the same direction as vector 312 for all relevant times, and that on day zero, the relative azimuth between star tracker 142 and the Sun (at position 320) is 0 degrees.

At the beginning of day zero, platform 110 is at position A, and approximately 12 hours later platform 110 is at position B. Line segment 322 illustrates the relative elevation of the Sun (e.g., a relative orientation of a light source) when platform 110 is at position A during day zero, and line segment 324 illustrates the relative elevation of the Sun when platform 110 is at position B during day zero. Line segment 332 illustrates the relative elevation of the Sun when platform 110 is at position A during day 182, and line segment 334 illustrates the relative elevation of the Sun when platform 110 is at position B during day 182. The primary undefined parameter in FIG. 3A is how the azimuth of platform 110 evolves throughout the year.

FIG. 3B illustrates a graph 301 of relative orientations of the Sun, relative to geostationary planetary orbit 314 for platform 110 including indirect self-imaging system 100 in accordance with an embodiment of the disclosure, where the azimuthal orientation of star tracker 142 is locked to a point on the surface of the Earth 310, such as in a surface monitoring satellite or a geostationary communications satellite, such that the relative azimuth of the Sun goes through approximately 360 degrees, once a day. As shown in FIG. 3B, graph 301 plots relative elevations to the Sun along axis 374, and relative azimuths to the Sun along axis 384. On day zero, platform 110 moves around Earth 310 such that the relative elevation starts at point A with relative azimuth of zero degrees, reaches point B half way through day zero and with relative azimuth of approximately 180 degrees, and then ends back approximately at point A with relative azimuth of approximately 0 (or 360) degrees. These substantially V-shaped raster scans continue to progress substantially towards the bottom-right until day ~182, where the relative elevation starts approximately at point A', reaches point B' approximately half way through day 182, and returns back to point A'. The V-shaped raster scans continue to the end of the year, now progressing towards the top right (including the azimuth-wrap), where the relative elevation starts at A, reaches point B, and returns back to approximately A. Thus, looking at the whole year in aggregate, the area 340 is scanned.

Adjusting the orbit, the various rotational rates, and/or other orientation parameters of the motion of platform 110 can be used to adjust the size and/or shape of the scan area, such as adjusting the range of elevations and azimuths scanned over a particular period of time. Moreover, base station 130 may be used or configured to send control signals to controller 112 to control operations of propulsion system 124 and/or attitude control system 126 to adjust angular velocities and/or other characteristics of the motion of platform 110 to increase or decrease the scan area, the range of elevations and/or azimuths covering the scan area, the rate at which a scan area is scanned, and/or the density of the raster scans within a particular scan area, and/or otherwise adjust or change various characteristics of a scan area, as desired.

FIG. 3C illustrates an image 352 of platform 210 in FIG. 2B generated by star tracker 142 of platform 210 in accordance with an embodiment of the disclosure. In various embodiments, image 352 of platform 210 represents a processed result of one example mapping of a set of background light intensities and a corresponding set of relative orientations of a light source (e.g., the Sun) to a two dimensional plane. In particular, image 352 is the negative of a relatively unprocessed image, such that in image 352, solid black areas (e.g., empty space 366) correspond to relative orientations of a light source where light from the light source is not occluded by structure of platform 210. Moreover, it should be understood that image 352 is an interpretational representation of an indirect self-image generated by system 100 and is not an actual image generated by a physical embodiment of system 100.

In FIG. 3C, image 352 of platform 110 is shown disposed within plot 302 generally to illustrate relative elevations, relative azimuths, and corresponding pixel positions within image 352, plotted according to relative elevation axis 374 and relative azimuth axis 384. As can be seen in FIG. 3C, image 352 depicts top surface 211 of platform 210, surface elements 260, 262, and 264 of platform 210, and empty space 366 about platform 210. Moreover, image 352 has sufficient contrast to differentiate surface and structural characteristics of top surface 211, surface elements 260, 262, and 264, and to differentiate elements of platform 210 from empty space 366.

In particular, image 352 has been generated by mapping intensity differentiated areas 360, 362, and 364 in a raw image corresponding to image 352 (e.g., and encompassing a larger scan area) to differentiate, define, and identify surface elements 260, 262, and 264 of platform 210 relative to top surface 211 of platform 210. For example, intensity differentiated areas 360, 362, and 364 may correspond to increases or decreases in background light intensities measured by star tracker 142 resulting from reflections or absorptions of sunlight off of surface elements 260, 262, and 264, relative to reflections or absorptions of sunlight off of top surface 211 of platform 210. Because intensity differentiated areas 360, 362, and 364 are outside the hemisphere centered along the boresight of star tracker 142, they typically must occur due to structure of platform 210 and may be mapped to such structure using knowledge of positioning and arrangement of such structure on platform 210 (e.g., known construction and/or deployment designs). In the embodiment shown in FIG. 3C, intensity differentiated areas 360, 362, and 364 are shown as mirror "ghost" images about symmetry points centered at 180 degrees in azimuth and 90 degrees in elevation for each area, where area 360 corresponds to surface element 260, area 362 corresponds to surface element 262, and area 364 corresponds to surface element 264. Other symmetries and mappings may exist depending on the placement of star tracker 142 on platform 210 and the range of relative orientations to the sun during a particular scan period.

Figure 4B:
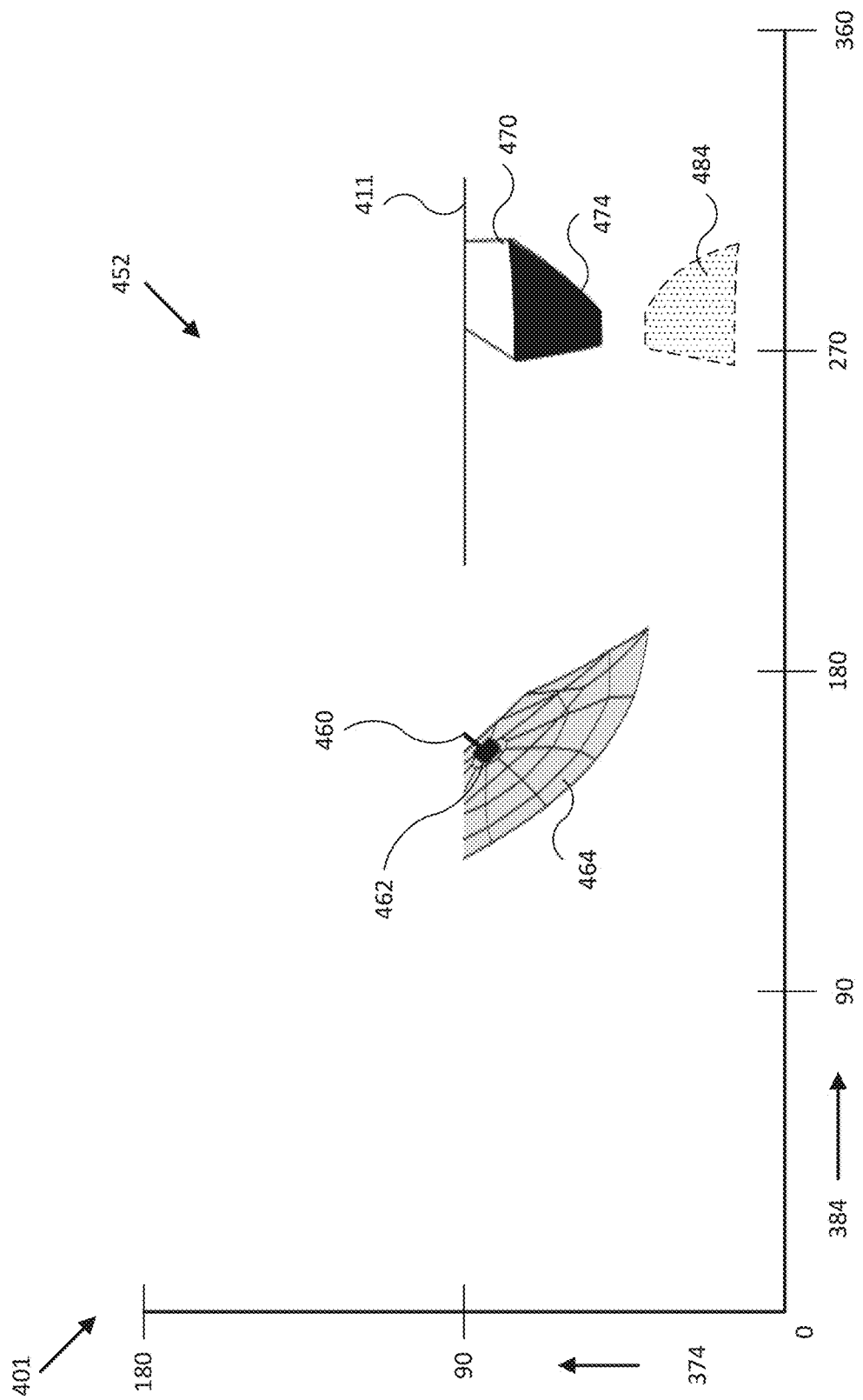
FIG. 4B illustrates an image of a mobile platform generated by an indirect self-imaging system of the mobile platform in accordance with an embodiment of the disclosure.

FIG. 4A illustrates a diagram of an optical sensor/star tracker 142 for an indirect self-imaging system 100 including a mobile platform 410 in accordance with an embodiment of the disclosure. In the embodiment shown in FIG. 4A, platform (e.g., satellite) 410 includes star tracker/light shield 142/246 aimed along solar panel 474 and laterally relative to antenna boom 460 of platform 410, where portions of mesh antenna dish 464, antenna support block/ feedhorn 462, and antenna boom 460, and portions of solar panel 474 and solar panel yoke 470, are substantially within the hemispherical scattered light detection zone of star tracker/light shield 142/246. As such, imagery generated by background light intensities provided by star tracker 142 may include image structure sufficient to differentiate the various elements from each other. With sufficient contrast (e.g., provided by corrections if necessary), or if the surface texture/reflectance/translucence of the various elements are sufficiently physically differentiated, imagery generated by background light intensities provided by star tracker 142 may include image pixel intensity detail sufficient to visually differentiate at least some of the various elements from each other, as shown generally in FIG. 4B.

In addition, platform 410 may include radio antenna 440 (e.g., an element of communications system 120, GNSS 118, or remote sensor system 140, for example), which may be used similarly to star tracker 142, but with respect to radio frequency (e.g., as opposed to optical) electromagnetic radiation (EMR), to detect and measure background EMR intensities that are modulated by the structure and orientation of platform 410 relative to an EMR source such that the background EMR intensities may themselves be used to generate an image of platform 410. For example, base station 130 may include a radio frequency EMR emitter or beam source (e.g., other modules 138) that may be configured to irradiate platform 410 with radio frequency EMR that can be measured by radio antenna 440. In some embodiments, the EMR source may be a GNSS satellite also in orbit about Earth 310. Radio antenna 440 may be coupled to GNSS 118, communications system 120, and/or remote sensor system 140, each of which may be configured to provide radio frequency data corresponding to operation of any of those systems, such as a noise level measurement, for example, and/or measurements of other radio signal characteristics, such as spectrum measurements and/or correlated signal steering measurements (e.g., as provided by a beamforming antenna), such that noise level measurements may in some embodiments include spectrum characteristics and source direction characteristics. In various embodiments, such noise measurements, which may be limited in time and/or according to a particular selected spectrum, for example, may be used directly as background radio frequency EMR intensities.

Radio antenna 440 may be implemented as a patch or other type antenna with a known radiation pattern (e.g., substantially omnidirectional, for example, such that the coupling of the EMR emitted by base station 130 to radio antenna 440 varies according to different orientations of radio antenna 440 relative to base station 130 (e.g., at a point on the surface of the earth) and/or when portions of platform 410 (e.g., star tracker/light shield 142/246, mesh antenna dish 464, antenna support block 462, antenna boom 460, solar panels 474 and 476, solar panel yokes 470 and 472, and/or surface 411) occlude or reflect the EMR emitted by base station 130. In other embodiments, radio antenna 440 may be configured to detect background EMR intensities corresponding to a known celestial radio frequency source, such as the Sun, Jupiter, Saturn, a neutron star, a pulsar, the galactic center, other satellites, and/or other EMR sources. As platform 410 changes orientation relative to such EMR source, an image of platform 410 may be generated based, at least in part, on the background EMR intensities and the relative orientations of the EMR source.

FIG. 4B illustrates an image 452 of platform 410 generated by star tracker 142 of platform 410 in accordance with an embodiment of the disclosure. In various embodiments, image 452 of platform 410 represents the result of one example mapping of a set of background light intensities and a corresponding set of relative orientations of a light source (e.g., the Sun) to a two dimensional plane. Moreover, it should be understood that image 452 is an interpretational representation of an indirect self-image generated by system 100 and is not an actual image generated by a physical embodiment of system 100.

In FIG. 4B, image 452 of platform 410 is shown disposed within plot 401 generally to illustrate relative elevations, relative azimuths, and corresponding pixel positions within image 452, plotted according to relative elevation axis 374 and relative azimuth axis 384. As can be seen in FIG. 4B, image 452 depicts solar panel yoke 470 and solar panel 474 protruding from a portion of top surface 411 of platform 410 and portions of antenna boom 460, mesh antenna dish 464, and antenna support block/feedhorn 462. Pixel positions corresponding to dark or solid black pixels (e.g., solar panel 474, the arms/booms of yoke 470, antenna boom 460, and antenna support block 462) indicate structure that occludes light emitted by the Sun, and pixels positions corresponding to greyscale pixels (e.g., mesh antenna dish 464) indicate structure that is at least partially translucent to (e.g., or partially occludes) sunlight at the pixel/scan resolution of system 100.

Also shown in image 452 is intensity differentiated area 484. In the embodiment presented in FIG. 4B, intensity differentiated area 484 corresponds to increased measured background intensities corresponding to sunlight reflections off of solar panel 474 (e.g., structure of platform 410). A processed version of image 452 may be generated by mapping intensity differentiated area 484 to solar panel 474 (e.g., using the relative orientations of the light source and/or various structural characteristics that are known or derived from image 452, for example) to increase or decrease or otherwise differentiate the portion of the processed image associated with solar panel 474 from, for example, antenna boom 460 and/or antenna support block 462, which, in the presented representational embodiment, are shown as not measurably reflecting or absorbing sunlight and so do not themselves generate separate intensity differentiated areas in image 452.

In general, the location of reflection-based features (such as intensity differentiated area 484) in self-images similar to image 452 is dependent on the relative positions and orientations of the sensor (e.g., star tracker 142), the reflection surface (e.g., including the surface normal of solar panel 474), and the EMR source. The intensity of the reflected signal is additionally dependent on the reflectivity of the reflection surface. Like occlusion-based information (e.g. solar panel 474 as represented in image 452 showing occlusion of a light source by solar panel 474), reflection-based features in image 452 (e.g. intensity differentiated area 484) can be used to determine various characteristics associated with structure of platform 410, such as determining surface properties (e.g. reflectivity), determining structure orientation relative to sensor, and/or determining structure location relative to sensor. Such information can be used in a variety of applications, including improving the quality (e.g., contrast, dynamic range, and/or perceivable detail) of image 452, determining the location and/or orientation of a deployable/deployed structure (e.g. solar panel 474), estimating sensor alignments, and/or assessing surface degradation (e.g. tarnish, damage).

FIGS. 5A-E illustrates flow diagrams representing processes 500, 501, 504, 506, and 528 including various operations to provide indirect self-imaging using imaging system 100 in accordance with an embodiment of the disclosure. In some embodiments, the operations of FIGS. 5A-E may be implemented as software instructions executed by one or more logic devices or controllers associated with corresponding electronic devices, sensors, and/or structures depicted in FIGS. 1-3C. More generally, the operations of FIGS. 5A-E may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of processes 500, 501, 504, 506, and 528 may be performed in an order or arrangement different from the embodiments illustrated by FIGS. 5A-E. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although the processes are described with reference to systems described in FIGS. 1-3C, the processes may be performed by other systems different from those systems and including a different selection of electronic devices, sensors, assemblies, mechanisms, platforms, and/or platform attributes.

At block 502, a set of background light intensities is determined. For example, controller 112 and/or controller 131 may be configured to determine a set of background light intensities associated with satellite/platform 110, where each background light intensity in the set of background light intensities corresponds to an orientation and/or position of a light source (e.g., Sun positions 320 or 330) relative to mobile platform (e.g., satellite) 110. Such light source is typically the Sun, but other light sources may be used, such as the Moon, an illuminated Earth limb, a ground or air based active illumination device (e.g., a laser), and/or one or more lights disposed along the external surface of satellite 110 (e.g., other modules 150).

More generally, controller 112 and/or controller 131 may be configured to determine a set of background EMR intensities associated with satellite/platform 110, such as background radio frequency EMR intensities measured by radio antenna 440 of platform 410, where each background EMR intensity in the set of background EMR intensities corresponds to an orientation and/or position of an EMR source (e.g., Sun positions 320 or 330, or base station 130 on the surface of Earth 310) relative to mobile platform (e.g., satellite) 110. Such EMR source may be an element of base station 130, for example, or may be a known celestial source, such as the Sun, Saturn, or Jupiter.

In embodiments where satellite 110 includes an optical sensor (e.g., remote sensor system 140, star tracker 142, sun sensor 144) coupled to satellite 110 and configured to provide celestial image data corresponding to an orientation and/or position of satellite 110 (and/or the optical sensor), controller 112 and/or controller 131 may be configured to determine the set of background light intensities based, at least in part, on the celestial image data provided by the optical sensor, where the set of relative orientations of the light source are relative to FPA 242 of the optical sensor or relative to satellite 110. Such background light intensities may be based on other characteristics of the optical sensor, such as light shield geometry, varying sensitivity across the FOV of the optical sensor (e.g., due to loss of charge transfer efficiency, vignetting in the optical train, optical contamination, and/or other characteristics of the optical sensor).

In various embodiments, controller 112, controller 131, and/or imaging electronics 244 may be configured to denoise background light intensities provided by an optical sensor, such as by removing or correcting problematic background light intensities due to issues such as stars/hot pixels in background region. Controller 112, controller 131, and/or imaging electronics 244 may also be configured to get a higher rate of background light intensity data by, for example, assigning unused virtual track resources of star tracker 142 (e.g., analysis resources of star tracker 142 either assigned to a detected star in a celestial image or left unused) to track additional stars (e.g., stars not of interest for attitude). This can be beneficial in that each tracked star may generate both a tracked star intensity and a corresponding background light intensity, thereby increasing the data rate.

In additional embodiments, controller 112, controller 131, and/or imaging electronics 244 may be configured to increase the signal to noise of such background light intensities. For example, conventional star trackers may base their data on sixteen pixels and the scaling may be such that there is usually only about five bits of useful dynamic range for each measurement. Controller 112 controller 131, and/or imaging electronics 244 may be configured to generate a background light intensity measurement based on summed energy in all virtual trackers—data from over one thousand pixels—which would greatly improve signal to noise. While the summation would initially include intensities of tracked stars, the intensities of the tracked stars would be identified in the telemetry data and could be subtracted out to leave only the background light intensity measurements.

In some embodiments, satellite 110 may include a second optical sensor (e.g., a second star tracker 142, and/or one or more of remote sensor system 140 and sun sensor 144), and controller 112 and/or controller 131 may be configured to determine the set of background light intensities based, at least in part, on the additional celestial image data provided by the second optical sensor, where the set of relative orientations of the light source are relative to FPA 242 of the optical sensor, relative to satellite 110, and/or relative to an FPA of the second optical sensor.

In embodiments where satellite 110 includes a temperature monitoring system with a plurality of temperature sensors each coupled to and/or within satellite 110 and each configured to provide temperature data corresponding to a portion of satellite 110, controller 112 and/or controller 131 may be configured to determine the set of background light intensities corresponding to satellite 110 based, at least in part, on the temperature data provided by the temperature monitoring system, where the set of relative orientations of the light source are relative to satellite 110. For example, controller 112 and/or controller 131 may be configured to map relatively low temperatures to relatively low background light intensities, and map relatively high temperatures to relatively high background light intensities. In some embodiments, such mapping may include linking temperature data to portions of satellite 110 according to metadata indicating positions of the temperature sensors within satellite 110 and/or relative to an orientation of satellite 110, retrieved from memories 146 and/or 136.

Figure 5A:
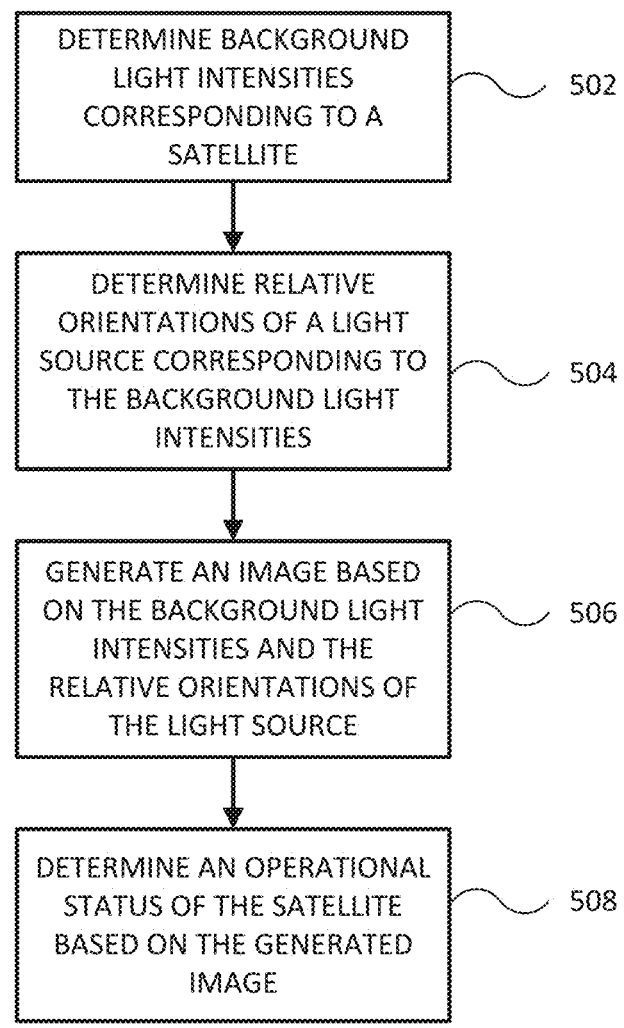
FIGS. 5A-E illustrate flow diagrams of various operations to provide indirect self-imaging using an indirect self-imaging system in accordance with an embodiment of the disclosure.

At block 504 in FIG. 5A, relative orientations of a light source are determined. For example, controller 112 and/or controller 131 may be configured to determine a set of relative orientations of a light source corresponding to the set of background light intensities determined in block 502. More generally, controller 112 and/or controller 131 may be configured to determine a set of relative orientations of an EMR source corresponding to a set of background EMR intensities determined in block 502.

Figure 5B:
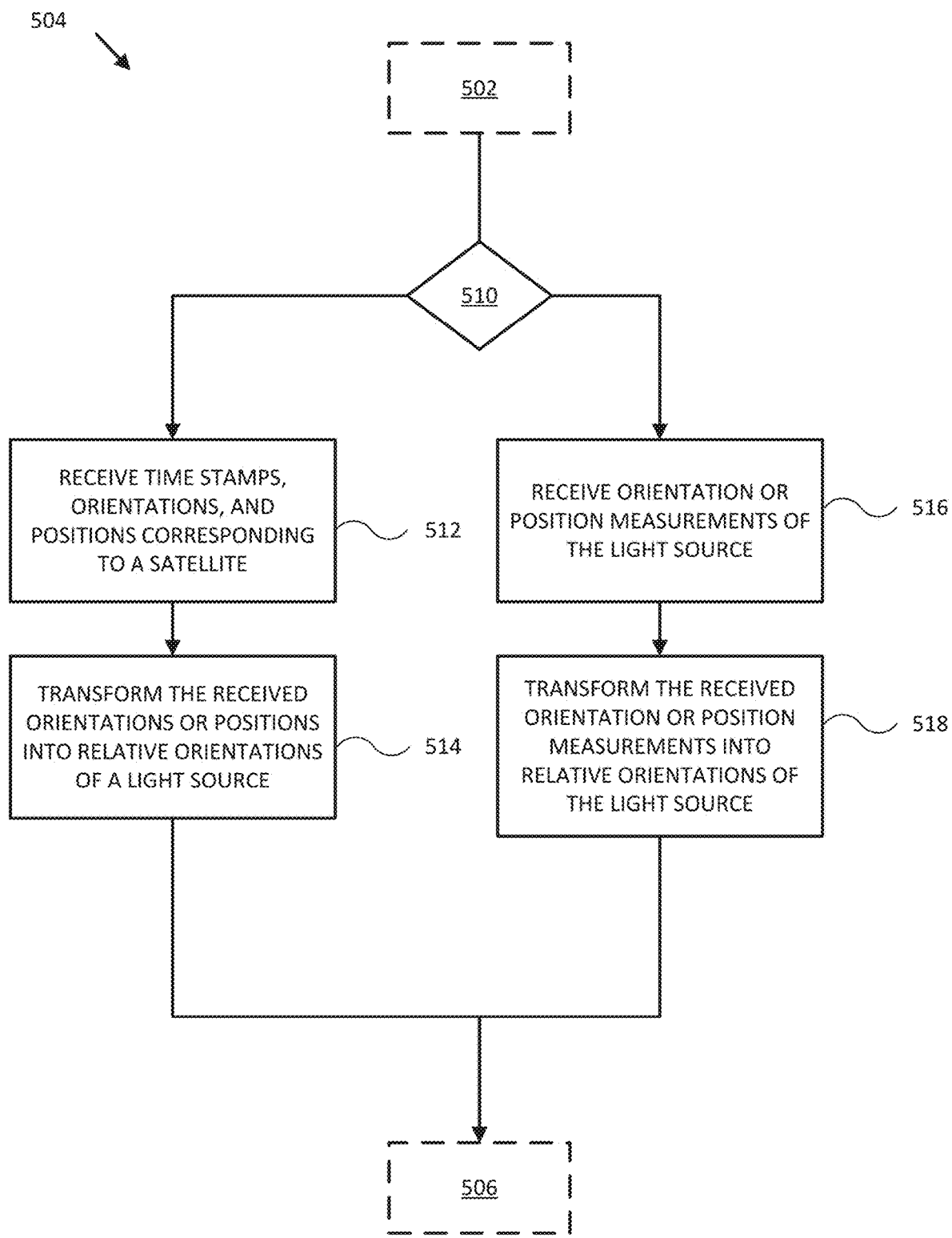

In some embodiments, as in block 512 of FIG. 5B, controller 112 and/or controller 131 may be configured to receive a set of time stamps (e.g., from an internal clock of one or more elements of system 100, and/or from GNSS 118) and a set of orientations and/or positions of satellite 110 corresponding to the set of background light intensities (e.g., from one or more from orientation sensor 114, gyroscope/accelerometer 116, GNSS 118, remote sensor system 140, star tracker 142, and/or sun sensor 144, or from a radar system or assembly of platform 110 and/or base station 130—other modules 138 and 150). In such embodiments, controller 112 and/or controller 131 may be configured to determine the set of relative orientations of the light source by, as in block 514 of FIG. 5B, transforming the set of orientations and/or positions of satellite 110 into the set of relative orientations of the light source based, at least in part, on a known time correspondence of the set of orientations and/or positions of satellite 110 to the set of relative orientations of the light source. For example, controller 112 and/or controller 131 may be configured to use a known time correspondence of the position of the Sun relative to Earth, and the set of orientations and/or positions of satellite 110 (e.g., relative to Earth) to determine the set of relative orientations of the light source (e.g., relative to satellite 110).

In other embodiments, as in block 516 of FIG. 5B, controller 112 and/or controller 131 may be configured to receive a set of orientation and/or position measurements of the light source from a light source sensor (e.g., sun sensor 144, or a solar panel) coupled to satellite 110. In such embodiments, controller 112 and/or controller 131 may be configured to determine the set of relative orientations of the light source (e.g., relative to star tracker 142) by, as in block 518 of FIG. 5B, transforming the set of orientation and/or position measurements of the light source (e.g., provided by sun sensor 144) into the set of relative orientations of the light source based, at least in part, on a known spatial correspondence of the set of orientation and/or position measurements of the light source to the set of relative orientations of the light source. For example, controller 112 and/or controller 131 may be configured to use a known coordinate frame transformation between orientations measured by sun sensor 144 and satellite 110 and/or star tracker 142, for example, and transform the orientations and/or positions of the light source into the coordinate frame of the background light intensities determined in block 502. Various implementation embodiments may be selected by a preset parameter and/or by user input provided to user interface 132, as represented by block 510 in FIG. 5B, for example.

One way of determining the sun vector in the sensor frame for a given light intensity measurement is to know (a) the vector from the sun to the sensor expressed in the Earth centered inertial (ECI) frame and (b) the orientation of the ECI frame relative to the sensor frame (e.g., as a quaternion or direction cosine matrix). Given these two quantities, the vector from the sensor to the sun can be calculated in the sensor frame. For earth orbiting satellites, a first approximation of the inertial direction from satellite to sun is the inertial direction from Earth to sun. Since that direction is a well-known function of time, in many cases the time of the light intensity measurement is all that is needed to determine the vector from the sensor to the sun to <0.02 degrees (arctangent(22,142/92 million)). The accuracy of this vector can be improved further if the ephemeris (the position and velocity with respect to the earth as a function of time) of satellite 110 is available as well as the time. Star trackers often directly provide the orientation from ECI to the star tracker as an output. For star trackers without that output, the orientation of the satellite to ECI is often telemetered, and the orientation of the star tracker to satellite 110 is known At block 506 of FIG. 5A, an image is generated. For example, controller 112 and/or controller 131 may be configured to generate an image of satellite 110 based, at least in part, on the set of background light intensities determined in block 502 and the set of relative orientations of the light source determined in block 504. More generally, controller 112 and/or controller 131 may be configured to generate an image of satellite 110 based, at least in part, on a set of background EMR intensities determined in block 502 and a set of relative orientations of an EMR source determined in block 504.

Figure 5C:
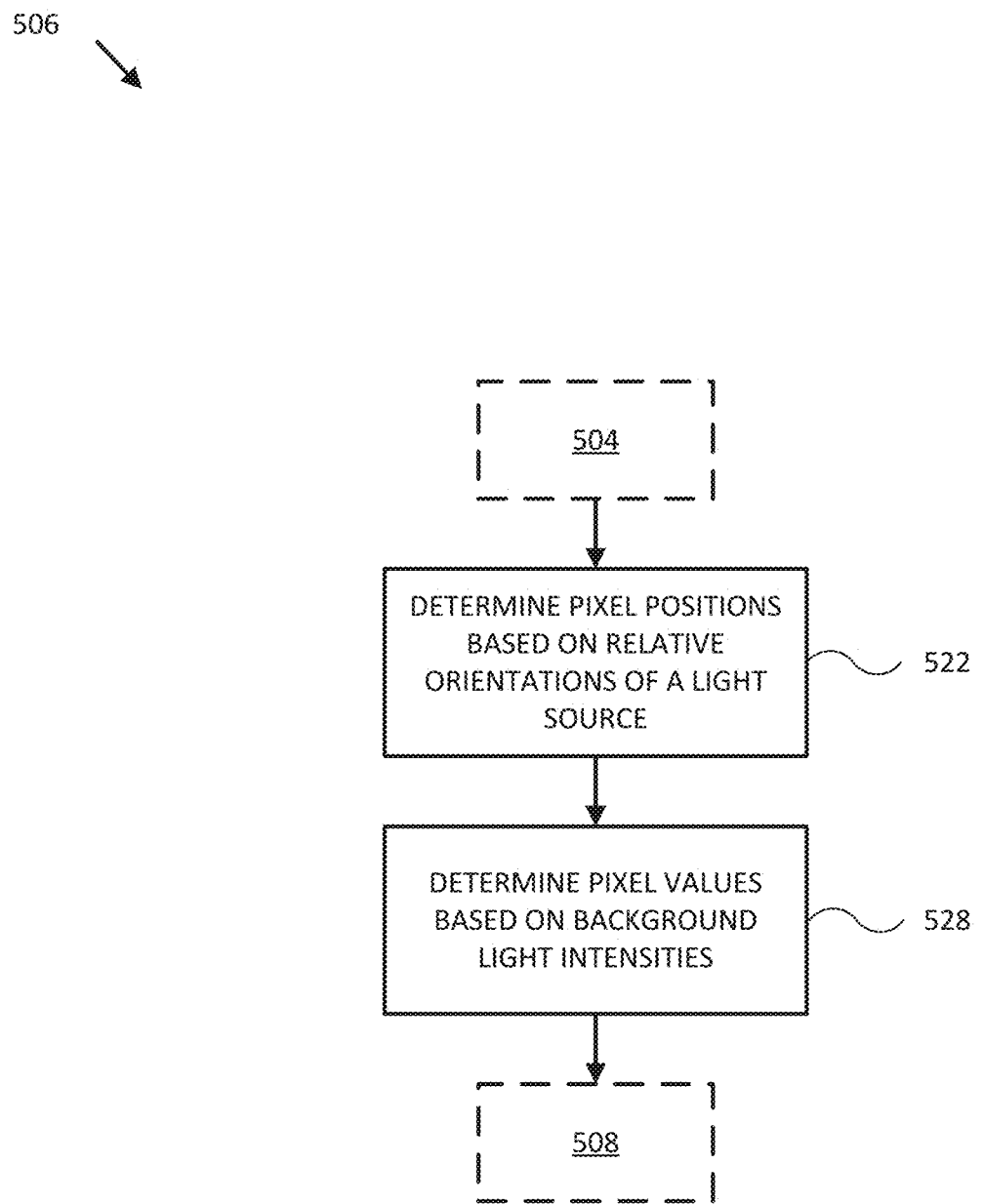

In some embodiments, controller 112 and/or controller 131 may be configured to generate the image of satellite 110 by, as in block 522 of FIG. 5C, determining a set of pixel positions within the image based on the set of relative orientations of the light source and determining, as in block 528 of FIG. 5C, a corresponding set of pixel values based, at least in part, on the determined set of background light intensities. For example, the set of pixel positions within the image may be determined based on a cylindrical or Mercator mapping of the set of relative orientations of the light source determined in block 504 to a two dimensional plane, and the set of pixel values may be determined based on the set of background light intensities determined in block 502, corresponding on a 1-1 basis to the set of relative orientations of the light source determined in block 504. In other embodiments, the set of pixel values may be determined based on a temporal and/or spatial average of background light intensities within a particular elevation or azimuthal range of each other within the set of background light intensities. Other mappings or projections from the set of relative orientations of the light source determined in block 504 are contemplated, such as to a rendered sphere (e.g., an interpolated icosahedron).

Figure 5D:
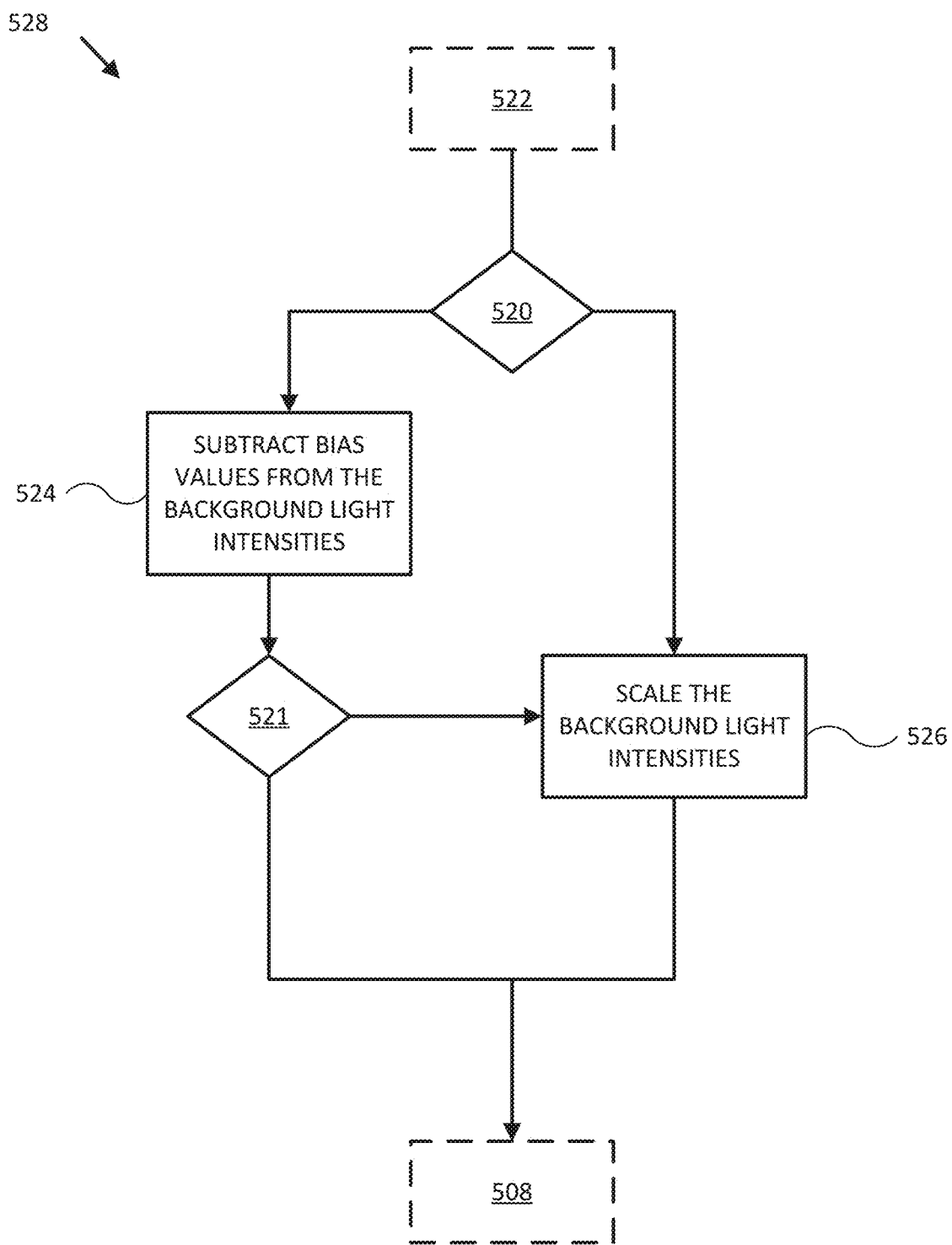
Figure 5E:
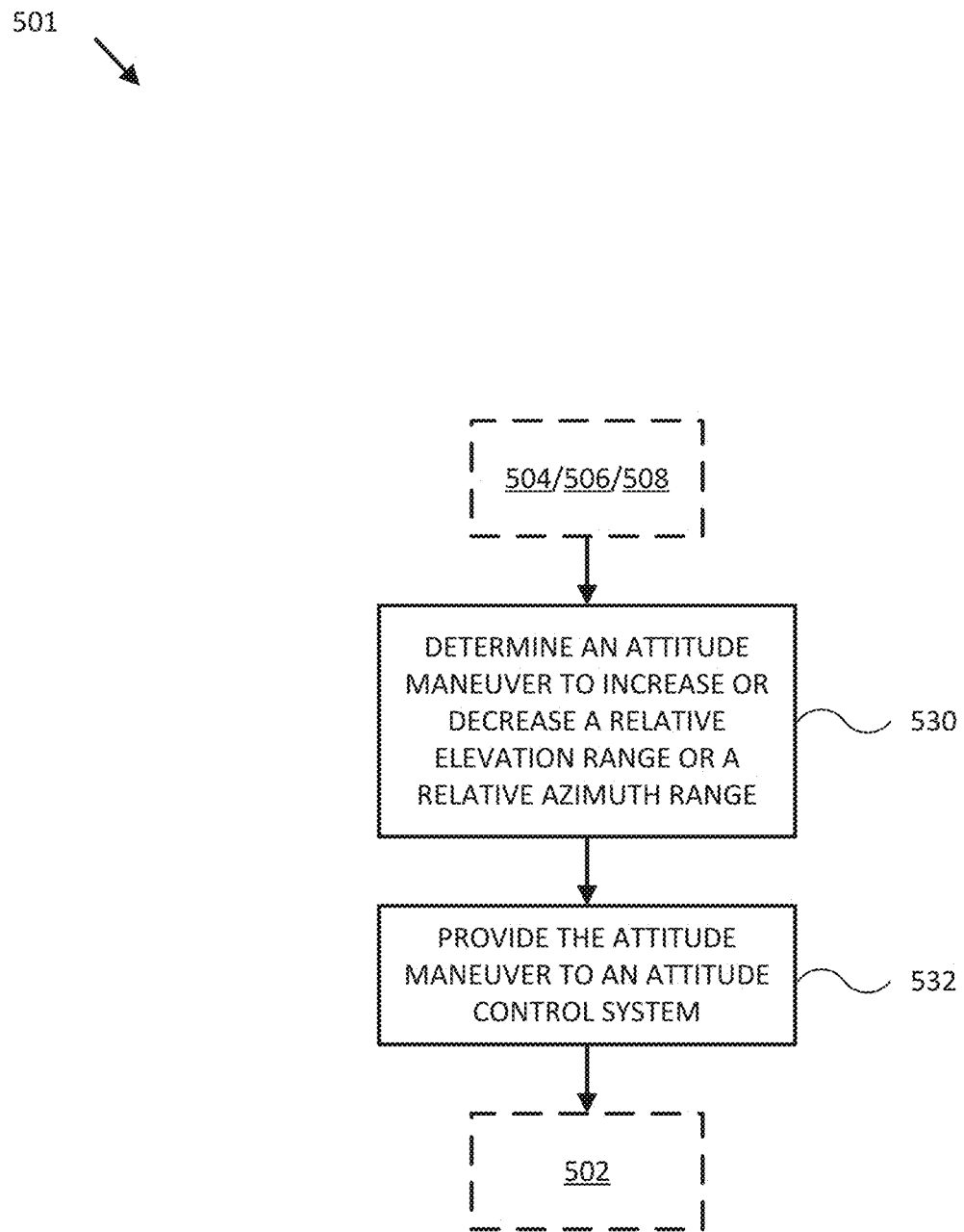

In particular embodiments, controller 112 and/or controller 131 may be configured to determine the set of pixel values by determining a set of background light intensities based, at least in part, on celestial image data provided by star tracker 142 coupled to satellite 110, subtracting, as in block 524 of FIG. 5D, a bias value associated with star tracker 142 from each background light intensity in the set of background light intensities to generate a set of bias corrected background light intensities, and/or scaling, as in block 526 of FIG. 5D, the set of bias corrected background light intensities according to a light shield attenuation function associated with star tracker 142, where the light shield attenuation function is configured to provide an attenuation scale factor based, at least in part, on a relative orientation of the Sun to star tracker 142 and/or a pixel location in the celestial image data corresponding to a background light intensity. In various embodiments, either or both the bias correction or the light shield attenuation correction may be omitted. Various implementation embodiments may be selected by preset parameters and/or by user input provided to user interface 132, as represented by blocks 520 and 521 in FIG. 5D.

For example, the light shield attenuation function typically generates a scale factor configured to compensate for an attenuation of oblique scattered light 250 that depends on the relative elevation of the angle of incidence of oblique scattered light 250 on light baffle 247 of light shield 246 at point 252 in FIG. 2A. However, the angle of the scattered light from point 252 intersecting optical elements 248 at point 254 is much different from the angle of scattered light from point 252 intersecting optical elements 248 at, for example, a point near the far left of optical element 248 (e.g., and FPA 242). Moreover, the pixel location of scattered light reaching FPA 242 is partially dependent upon whether that pixel position corresponds to background light or to a detected star. As such, the light shield attenuation function may be modified to generate a scale factor configured to compensate for an attenuation of oblique scattered light 250 that depends on one or more of the relative elevation of the angle of incidence of oblique scattered light 250 and a pixel location in the celestial image data corresponding to a background light intensity. In addition, the bias value associated with star tracker 142 may in some embodiments also be FPA-pixel position dependent, and the bias subtraction described herein may include identifying the appropriate FPA-pixel position dependent bias values corresponding to each background light intensity before subtracting such bias values to generate the set of bias corrected background light intensities.

In embodiments where satellite 110 includes multiple optical sensors configured to provide different sets of background light intensities for a single relative orientation of a light source, and therefore multiple different scan areas and/or image perspectives, such imagery may be combined to increase an aggregate monitored scan area, to reduce the time needed to scan a particular scan area, to increase image quality (e.g., through noise reduction), and/or to provide additional spatial information from which to determine depth. For example, in some embodiments, two images from different perspectives may be used to triangulate the position of the end of a solar panel boom and determine if the solar panel has fully deployed. In additional embodiments, such imagery may be combined to form a composite three dimensional model of satellite 110 as observed in orbit or while travelling through space.

Often, the intent of generating an image of satellite 110 is to infer the state of the satellite from intensity variations in the generated image. In the simplest case, the measured light intensity would be a function only of the lighting vector in the sensor frame. However, the measured light intensity can be affected by other environmental factors, such as: sunlight blockage by external objects including the earth, moon, other spacecraft, planets, moons, asteroids, etc.; reflected sunlight from external objects; (for star trackers) the light shield attenuation factor as a function of lighting vector direction; motion of spacecraft articulated appendages such as solar wings, antennas, booms, etc.; reflected sunlight from spacecraft elements, especially mirrored radiative surfaces or blankets; blockage of sunlight from spacecraft elements; variations in sun intensity due to variations in distance from sun; temperature dependence of sensor reported light intensity; (for pixel array sensors) intensity variations in stray light over the pixel array; transparency, dimensions, and orientations of structure.

Metadata (information about various environmental and/or operational factors), when available, can be used to correct the generated images. The angular subtense (e.g., subtending line) of the sun at earth is about 0.54 degrees diameter, but if some edges of satellite 110 are "hard", they can be located far more precisely than 0.54 degrees by detecting and identifying transitions from full sun to hard shadow as satellite 110 rotates. Metadata such as CAD drawings of satellite 110, ground photos, etc., can provide insight as to which edges can be used as hard edges.

At block 508, an operational status of a satellite is determined. For example, controller 112 and/or controller 131 may be configured to determine an operational status of satellite 110 based on the image generated in block 506. In some embodiments, the operational status of satellite 110 may include one or more of a deployment status of satellite 110 and a surface status of satellite 110. For example, satellite 110 may be implemented with an antenna boom, a remote sensor boom, and/or a solar panel extension boom, for example, and controller 112 and/or controller 131 may be configured to analyze one or more images generated in block 506 to monitor extending such boom and/or device to ensure it deploys completely. For example, in embodiments with multiple optical sensors, three dimensional models and/or mappings may be generated using different perspectives of the same external surface of satellite 110, for example, and such depth mappings or models may be compared to a computer aided drawing of satellite 110, depicting pre and post deployment, to detect and quantify errors in deployments.

In another example, controller 112 and/or controller 131 may be configured to analyze a time series images generated in block 506 to detect a surface status of one or more surface elements 260, 262, and 264, or to detect a change in the surface status of one or more surface elements 260, 262, and 264. For example, a relatively unblemished surface 260 may be highly reflective and/or specular and relatively bright in a first image generated in block 506, but over time, or after a collision event, become dented or corroded or otherwise damaged, such that surface 260 becomes detectably tarnished, less reflective, more diffuse, and/or relatively dim in a later image generated in block 506. Such surface statuses may include absolute or relative reflectivity (e.g., averaged over the total surface), continuity (e.g., size and/or statistical distribution of sizes of continuous surface areas—such as unblemished connected areas within surface 260), boundary consistency (e.g., relative to known structure), and/or other surface statuses that can be identified in images generated in block 506 and/or monitored by controller 112 and/or 131. In a specific example, the surface of a heat radiator may be analyzed over time to detect damage or increasing surface degradation that might cause satellite 110 to fail if not addressed preemptively.

In some embodiments, controller 112 and/or 131 may be configured to analyze an image of satellite 110 generated in block 506 and determine that the source scan area (e.g., scan area 340) are too small or do not image desired portions of the exterior of satellite 110. In such embodiments, controller 112 and/or 131 may be configured to determine, as in block 530 of FIG. 5E, an attitude maneuver configured to increase or decrease at least one of a relative elevation range and/or a relative azimuth range corresponding to the set of relative orientations determined in block 504, for example, and provide, as in block 532 of FIG. 5E, the attitude maneuver to attitude control system 126 of satellite 110, so as to cause satellite 110 to perform the attitude maneuver. In various embodiments, such attitude maneuver may be provided to satellite 110 prior to determining the set of background light intensities in block 502, for example, or may be integrated elsewhere within process 500, as shown generally in process 501 of FIG. 5E. In related embodiments, controller 112 and/or 131 may be configured to determine an attitude maneuver to calibrate an optical sensor. For example, controller 112 and/or 131 may be configured to maneuver light shield 246 in and out of shadow to determine the light shield rejection value as a function of the relative orientation of the Sun (out of shadow) and to determine bias value(s) (e.g., black level and/or dark current, per pixel) for an FPA of the optical sensor. More generally, attitude maneuvers may be determined to target an approximate 50% sun occultation when determining background light intensities, such as in block 502.

In some embodiments, process 500 may be used to characterize motion of moveable appendages of satellite 110 by performing blocks 502-506 while moving the appendage (e.g., such as extending or retracting a boom, articulating an antenna or remote sensor system 140, etc.). Such characterization may be enhanced by determining an appropriate attitude maneuver to, for example, scan a particular area corresponding to the moveable appendage in a relatively short period of time, or to leverage multiple sensors simultaneously. Process 500 may be used similarly to characterize a thruster plume.

In addition, while portions of process 500 are described in relation to the modulation of light as it is selectively shadowed or otherwise affected by portions of satellite 110, embodiments are able to perform similar image generation using other electromagnetic radiation spectrums and/or sources, such a radio frequency transmissions (e.g., from base station 130 and/or celestial sources) detected by a radio frequency antenna (e.g., of communications system 120, GNSS 118, remote sensor system 140, and/or other modules 138), as described herein.

It should be noted that any or all blocks of the processes shown in FIGS. 5A-E may be performed on data that has been captured previously and stored, in addition to being performed on real time data. In particular, blocks 502, 504, and 506 for image generation may be used to generate historical images of satellites that have transferred telemetry and related data to base station 130, for example, and have subsequently deorbited.

By providing such systems and techniques for indirect self-imaging, embodiments of the present disclosure substantially improve the operational flexibility and reliability of unmanned spaceborne sensor and/or communications platforms, and do so without burdening the platforms with additional sensors or mechanical actuators. Moreover, such systems and techniques may be used to increase the operational lifetime of unmanned spaceborne platforms by providing monitoring of various visible operational aspects of the platforms in a manner that allows operators to quantify, predict, and potentially mitigate risk of certain failures before they can reach a critical state and/or take the platform offline. As such, embodiments provide spaceborne sensor and/or communications platforms with significantly increased operational performance and robustness.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

As used herein, the term "and/or" indicates that a particular selection or grouping of listed elements may include all of the listed elements, any sub-combination or ordering of the listed elements, or any one of the listed elements (e.g., where inclusion of all elements or sub-combinations of elements is not contradictory).

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system, comprising:
 a controller (112, 131) configured to:
  determine (502) a set of background light intensities associated with a satellite (110, 210), wherein each background light intensity corresponds to at least one of an orientation and a position of a light source (320, 330) relative to the satellite;

determine (504) a set of relative orientations of the light source (322, 324, 332, 334) corresponding to the set of background light intensities; and generate (506) an image (352, 452) of the satellite based, at least in part, on the determined set of background light intensities and the determined set of relative orientations of the light source.

2. The system of claim 1, wherein:

the satellite comprises an optical sensor (140, 142, 144) coupled to the satellite and configured to provide celestial image data corresponding to at least one of an orientation and a position of the satellite;

the determining the set of background light intensities is based, at least in part, on the celestial image data provided by the optical sensor; and the light source is outside a field of view of the optical sensor and the set of relative orientations of the light source are relative to a focal plane assembly (242) of the optical sensor or relative to the satellite.

3. The system of claim 2, wherein:

the optical sensor comprises a first optical sensor, the celestial image data comprises first celestial image data, the field of view comprises a first field of view, and the focal plane assembly comprises a first focal plane assembly;

the satellite comprises a second optical sensor (140, 142, 144) coupled to the satellite and configured to provide additional celestial image data corresponding to the orientation or position of the satellite, substantially simultaneously with the first optical sensor providing the first celestial image data;

the determining the set of background light intensities is based, at least in part, on the first and additional celestial image data; and the set of relative orientations of the light source are relative to at least one of the focal plane assembly (242) of the first optical sensor, the satellite, and the second optical sensor.

4. The system of claim 1, wherein:

the satellite comprises a temperature monitoring system (143) comprising a plurality of temperature sensors each coupled to or within the satellite and each configured to provide temperature data corresponding to a portion of the satellite;

the determining the set of background light intensities corresponding to the satellite is based, at least in part, on the temperature data provided by the temperature monitoring system; and the set of relative orientations of the light source are relative to the satellite.

5. The system of claim 1, wherein the determining the set of relative orientations of the light source comprises:

receiving (512) a set of time stamps and a set of orientations or positions of the satellite corresponding to the set of background light intensities; and determining (504) the set of relative orientations of the light source by transforming (514) the set of orientations or positions of the satellite into the set of relative orientations of the light source based, at least in part, on a known time correspondence of the set of orientations or positions of the satellite to the set of relative orientations of the light source.

6. The system of claim 1, wherein the determining the set of relative orientations of the light source comprises:

receiving (516) a set of orientation or position measurements of the light source from a light source sensor (144) coupled to the satellite; and determining (504) the set of relative orientations of the light source by transforming (518) the set of orientation or position measurements of the light source into the set of relative orientations of the light source based, at least in part, on a known spatial correspondence of the set of orientation or position measurements of the light source to the set of relative orientations of the light source.

7. The system of claim 1, wherein the generating the image of the satellite comprises:

determining (522) a set of pixel positions within the image based on the set of relative orientations of the light source; and determining (528) a corresponding set of pixel values based, at least in part, on the determined set of background light intensities.

8. The system of claim 7, wherein the light source is the Sun, the determining (502) the set of background light intensities is based, at least in part, on celestial image data provided by a star tracker (142) coupled to the satellite, and the determining the corresponding set of pixel values comprises:

subtracting (524) a bias value associated with the star tracker from each background light intensity in the set of background light intensities to generate a set of bias corrected background light intensities; and scaling (526) the set of bias corrected background light intensities according to a light shield attenuation function associated with the star tracker, wherein the light shield attenuation function is configured to provide an attenuation scale factor based, at least in part, on at least one of a relative orientation of the Sun to the star tracker and a pixel location in the celestial image data corresponding to a background light intensity.

9. The system of claim 1, wherein the controller is configured to:

determine (530) an attitude maneuver configured to increase or decrease at least one of a relative elevation range and a relative azimuth range corresponding to the determined set of relative orientations; and provide (532) the attitude maneuver to an attitude control system (126) of the satellite before the determining the set of background light intensities.

10. The system of claim 1, wherein the controller is configured to:

determine (508) an operational status of the satellite based on the generated image, wherein the operational status of the satellite comprises one or more of a deployment status of the satellite and a surface status of the satellite.

11. A method comprising:

determining (502) a set of background electromagnetic radiation "EMR" intensities associated with a satellite (110, 210), wherein each background EMR intensity corresponds to at least one of an orientation and a position of an EMR source (130, 320, 330) relative to the satellite;

determining (504) a set of relative orientations of the EMR source (322, 324, 332, 334) corresponding to the set of background EMR intensities; and generating (506) an image (352, 452) of the satellite based, at least in part, on the determined set of background EMR intensities and the determined set of relative orientations of the EMR source.

12. The method of claim 11, wherein:
the background EMR intensities comprise background light intensities and the EMR source comprises a light source;
the satellite comprises an optical sensor (140, 142, 144) coupled to the satellite and configured to provide celestial image data corresponding to at least one of an orientation and a position of the satellite;
the determining the set of background light intensities is based, at least in part, on the celestial image data provided by the optical sensor; and
the light source is outside a field of view of the optical sensor and the set of relative orientations of the light source are relative to a focal plane assembly (242) of the optical sensor or relative to the satellite.

13. The method of claim 12, wherein:
the optical sensor comprises a first optical sensor, the celestial image data comprises first celestial image data, the field of view comprises a first field of view, and the focal plane assembly comprises a first focal plane assembly;
the satellite comprises a second optical sensor (140, 142, 144) coupled to the satellite and configured to provide additional celestial image data corresponding to the orientation or position of the satellite, substantially simultaneously with the first optical sensor providing the first celestial image data;
the determining the set of background light intensities is based, at least in part, on the first and additional celestial image data; and
the set of relative orientations of the light source are relative to at least one of the focal plane assembly (242) of the first optical sensor, the satellite, and the second optical sensor.

14. The method of claim 11, wherein:
the satellite comprises a temperature monitoring system (143) comprising a plurality of temperature sensors each coupled to or within the satellite and each configured to provide temperature data corresponding to a portion of the satellite;
the determining the set of background EMR intensities corresponding to the satellite is based, at least in part, on the temperature data provided by the temperature monitoring system; and
the set of relative orientations of the EMR source are relative to the satellite.

15. The method of claim 11, wherein the determining the set of relative orientations of the EMR source comprises:
receiving (512) a set of time stamps and a set of orientations or positions of the satellite corresponding to the set of background EMR intensities; and
determining (504) the set of relative orientations of the EMR source by transforming (514) the set of orientations or positions of the satellite into the set of relative orientations of the EMR source based, at least in part, on a known time correspondence of the set of orientations or positions of the satellite to the set of relative orientations of the EMR source.

16. The method of claim 11, wherein the background EMR intensities comprise background light intensities and the EMR source comprises a light source, and wherein the determining the set of relative orientations of the light source comprises:
receiving (516) a set of orientation or position measurements of the light source from a light source sensor (144) coupled to the satellite; and
determining (504) the set of relative orientations of the light source by transforming (518) the set of orientation or position measurements of the light source into the set of relative orientations of the light source based, at least in part, on a known spatial correspondence of the set of orientation or position measurements of the light source to the set of relative orientations of the light source.

17. The method of claim 11, wherein the generating the image of the satellite comprises:
determining (522) a set of pixel positions within the image based on the set of relative orientations of the EMR source; and
determining (528) a corresponding set of pixel values based, at least in part, on the determined set of background EMR intensities.

18. The method of claim 17, wherein the background EMR intensities comprise background light intensities, the EMR source comprises a light source, the determining (502) the set of background EMR intensities comprises determining (502) a set of background light intensities based, at least in part, on celestial image data provided by a star tracker (142) coupled to the satellite, and the determining the corresponding set of pixel values comprises:
subtracting (524) a bias value associated with the star tracker from each background light intensity in the set of background light intensities to generate a set of bias corrected background light intensities; or
scaling (526) the set of background light intensities according to a light shield attenuation function associated with the star tracker, wherein the light shield attenuation function provides a scale factor based, at least in part, on at least one of a relative orientation of the light source to the star tracker and a pixel location in the celestial image data corresponding to a background light intensity.

19. The method of claim 11, further comprising:
determining (530) an attitude maneuver configured to increase or decrease at least one of a relative elevation range and a relative azimuth range corresponding to the determined set of relative orientations; and
providing (532) the attitude maneuver to an attitude control system (126) of the satellite before the determining the set of background EMR intensities.

20. The method of claim 11, further comprising:
determining (508) an operational status of the satellite based on the generated image, wherein the operational status of the satellite comprises one or more of a deployment status of the satellite and a surface status of the satellite.

21. The method of claim 11, wherein:
the background EMR intensities comprise background radio frequency EMR intensities;
the EMR source comprises a radio frequency EMR source;
the satellite comprises a radio frequency antenna (440) and at least one of a global navigation satellite system (118), a communications system (120), and a remote sensor system (140), configured to provide radio frequency data corresponding to operation of the global navigation satellite system, communications system, or remote sensor system;
the determining the set of background radio frequency EMR intensities is based, at least in part, on the radio frequency data provided by the global navigation satellite system, communications system, or remote sensor system; and the set of relative orientations of the radio frequency EMR source are relative to at least one of the radio frequency antenna and the satellite.

\* \* \* \* \*